US012583073B2

(12) United States Patent
Shim et al.

(10) Patent No.: US 12,583,073 B2
(45) Date of Patent: Mar. 24, 2026

(54) GLASS POLISHING APPARATUS AND GLASS POLISHING METHOD USING THE SAME

(71) Applicant: SAMSUNG DISPLAY CO., LTD., Yongin-si (KR)

(72) Inventors: Gyu In Shim, Yongin-si (KR); Byung Hoon Kang, Hwaseong-si (KR); Seung Kim, Seongnam-si (KR); Seung Ho Kim, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/764,511

(22) Filed: Jul. 5, 2024

(65) Prior Publication Data

US 2024/0359284 A1 Oct. 31, 2024

Related U.S. Application Data

(62) Division of application No. 17/348,745, filed on Jun. 15, 2021, now Pat. No. 12,059,771.

(30) Foreign Application Priority Data

Sep. 22, 2020 (KR) ......................... 10-2020-0122267

(51) Int. Cl.
B24B 7/24 (2006.01)
B24B 7/07 (2006.01)
(Continued)

(52) U.S. Cl.
CPC .............. B24B 7/241 (2013.01); B24B 7/075 (2013.01); C03C 15/02 (2013.01)

(58) Field of Classification Search
CPC .... B24B 7/00; B24B 7/07; B24B 7/17; B24B 7/222; B24B 7/224; B24B 7/24;
(Continued)

(56) References Cited

U.S. PATENT DOCUMENTS 6,247,197 B1 6/2001 Vail et al.
8,460,060 B2 * 6/2013 Wilson ...................... B24B 1/00
451/63

(Continued)

FOREIGN PATENT DOCUMENTS

CN 1639848 A 7/2005
CN 206064855 U 4/2017
(Continued)

OTHER PUBLICATIONS

Office Action dated Dec. 14, 2023 in corresponding U.S. Appl. No. 17/348,745.

*Primary Examiner* — Brian D Keller
*Assistant Examiner* — John C Merino
(74) *Attorney, Agent, or Firm* — F. CHAU & ASSOCIATES, LLC

(57) ABSTRACT

A glass polishing apparatus includes a jig that holds a glass structure. The glass polishing apparatus includes a first flat portion, a second flat portion opposite to the first flat portion, and a curved portion connecting the first flat portion to the second flat portion. The jig and includes a first holding surface holding the first flat portion, a second holding surface disposed opposite to the first holding surface and holding the second flat portion, and a third holding surface connecting the first holding surface to the second holding surface and holding the curved portion. At least a portion of a roller unit having a cylindrical shape is inserted between the first flat portion and the second flat portion.

10 Claims, 23 Drawing Sheets

(51) Int. Cl.
  *C03B 15/02*    (2006.01)
  *C03C 15/02*    (2006.01)

(58) Field of Classification Search
  CPC ........... B24B 7/242; B24B 9/08; B24B 29/00;
     B24B 29/005; B24B 29/02; B24B 41/02;
     B24B 41/053; B24B 41/06; B24B 37/04;
     B24B 5/10; B24B 19/006; B24B 19/26;
     B24B 29/08; B24B 9/10; B24B 9/12;
     B24B 41/067; B24B 41/068; H01L
     21/67313; H01L 21/67326; B23Q 3/088;
     B65B 61/20; B65B 63/04; B65B 5/04
  See application file for complete search history.

(56)      References Cited

U.S. PATENT DOCUMENTS

| | | |
|---|---|---|
| 2002/0066468 A1 | 6/2002 | Vail et al. |
| 2005/0148183 A1 | 7/2005 | Shiro et al. |

| | | |
|---|---|---|
| 2010/0197203 A1 | 8/2010 | Wilson et al. |
| 2012/0151760 A1 | 6/2012 | Steijner |
| 2018/0059454 A1 | 3/2018 | Shin et al. |
| 2022/0088741 A1 | 3/2022 | Shim et al. |

FOREIGN PATENT DOCUMENTS

| | | | |
|---|---|---|---|
| CN | 210968337 | U | 7/2020 |
| JP | 2000-239033 | | 9/2000 |
| JP | 2000-326191 | A2 | 11/2000 |
| KR | 10-2013-0057039 | | 5/2013 |
| KR | 10-2015-0002176 | | 1/2015 |
| KR | 10-2015-0073688 | A | 7/2015 |
| KR | 10-1621333 | | 5/2016 |
| KR | 10-1758981 | | 7/2017 |
| KR | 10-1926348 | | 12/2018 |
| KR | 10-2019-0118891 | | 10/2019 |
| KR | 10-2019-0124034 | | 11/2019 |
| WO | 2017-205605 | | 11/2017 |
| WO | WO2018030675 | A1 | 2/2018 |
| WO | 2019199073 | | 10/2019 |

* cited by examiner

G: G_1, G_2, G_3

| | |
|---|---|
| TOUCH LAYER | TSL |
| ENCAPSULATION LAYER | ENL |
| LIGHT EMITTING LAYER | EML |
| CIRCUIT DRIVING LAYER | DRL |
| SUBSTRATE | SUB |

(a)

(b)

(a)

(b)

GLASS POLISHING APPARATUS AND GLASS POLISHING METHOD USING THE SAME

CROSS-REFERENCE TO RELATED APPLICATION

This application is a Division of co-pending U.S. patent application Ser. No. 17/348,745, filed on Jun. 15, 2021, which claims priority under 35 U.S.C. § 119 to Korean Patent Application No. 10-2020-0122267, filed on Sep. 22, 2020 in the Korean Intellectual Property Office, the contents of which are herein incorporated by reference in their entirety.

TECHNICAL FIELD

The present disclosure relates to glass polishing and, more specifically, to a glass polishing apparatus and a glass polishing method using the same.

DISCUSSION OF THE RELATED ART

Various different types of display devices, such as liquid crystal display (LCD) devices and organic light emitting diode (OLED) display devices are being used to meet the needs of modern electronic devices.

A display device may include glass that protects the display panel and constitutes its exterior surface. According to a design of the display device, the glass may have a plate shape (e.g., a flat shape), have a bent edge (e.g., a predominantly flat shape with one or more edges that are curved downwardly), or be curved or folded (e.g., a shape with a substantial curve or fold that is not necessarily limited to the edges thereof).

A polishing process may be performed to provide a smooth surface to the glass of various shapes, increase illuminance, decrease haze which may reduce display clarity, and reduce a thickness of the glass so as to provide a thinner device.

SUMMARY

A glass polishing apparatus includes a jig that is configured to hold a glass product. The glass product includes a first flat portion, a second flat portion opposite to the first flat portion, and a curved portion connecting one side of the first flat portion and one side of the second flat portion. The jig includes a first holding surface configured to hold the first flat portion of the glass product, a second holding surface disposed opposite to the first holding surface and configured to hold the second flat portion of the glass product, and a third holding surface configured to connect one side of the first holding surface and one side of the second holding surface and hold the curved portion of the glass product. A roller unit has a cylindrical shape and at least a portion of the roller unit is disposed between the first flat portion of the glass product and the second flat portion of the glass product.

A glass polishing apparatus includes a jig that is configured to hold a glass product. The glass product includes a first flat portion, a second flat portion opposite to the first flat portion, and a curved portion connecting one side of the first flat portion and one side of the second flat portion. The jig includes a first holding groove into which one end of the first flat portion of the glass product is disposed and a second holding groove into which one end of the second flat portion of the glass product is disposed. A roller unit has a cylindrical shape and at least a portion of the roller unit is disposed between the first flat portion of the glass product and the second flat portion of the glass product.

A glass polishing apparatus includes a jig that includes a first holding surface having a flat shape and a second holding surface that is opposite to the first holding surface and has a flat shape. A roller unit includes a cylinder and a plurality of bristles disposed on an outer circumferential surface of the cylinder. A diameter of the cylinder is smaller than a gap between the first holding surface and the second holding surface of the jig.

A method for polishing glass includes placing a glass in a jig, the glass having a first flat portion, a second flat portion opposite to the first flat portion, and a curved portion that connects one side of the first flat portion to one side of the second flat portion. A roller unit is moved between the first flat portion of the glass and the second flat portion of the glass to polish a concave side of the curved portion of the glass.

BRIEF DESCRIPTION OF THE DRAWINGS

The above and other aspects and features of the present disclosure will become more apparent by describing embodiments thereof in detail with reference to the attached drawings, in which.

DETAILED DESCRIPTION OF THE EMBODIMENTS

Embodiments of the present disclosure will now be described more fully hereinafter with reference to the accompanying drawings. This invention may, however, be embodied in different forms and should not necessarily be construed as limited to the embodiments set forth herein. Rather, these embodiments are provided so that this disclosure will be thorough and complete, and will filly convey the scope of the invention to those skilled in the art. The same reference numbers may indicate the same components throughout the specification and figures. In the attached figures, the thickness of layers and regions may be exaggerated for clarity.

It will also be understood that when a layer is referred to as being "on" another layer or substrate, it can be directly on the other layer or substrate, or intervening layers may also be present.

Hereinafter, embodiments of the present disclosure will be described with reference to the accompanying drawings.

Figure 1:
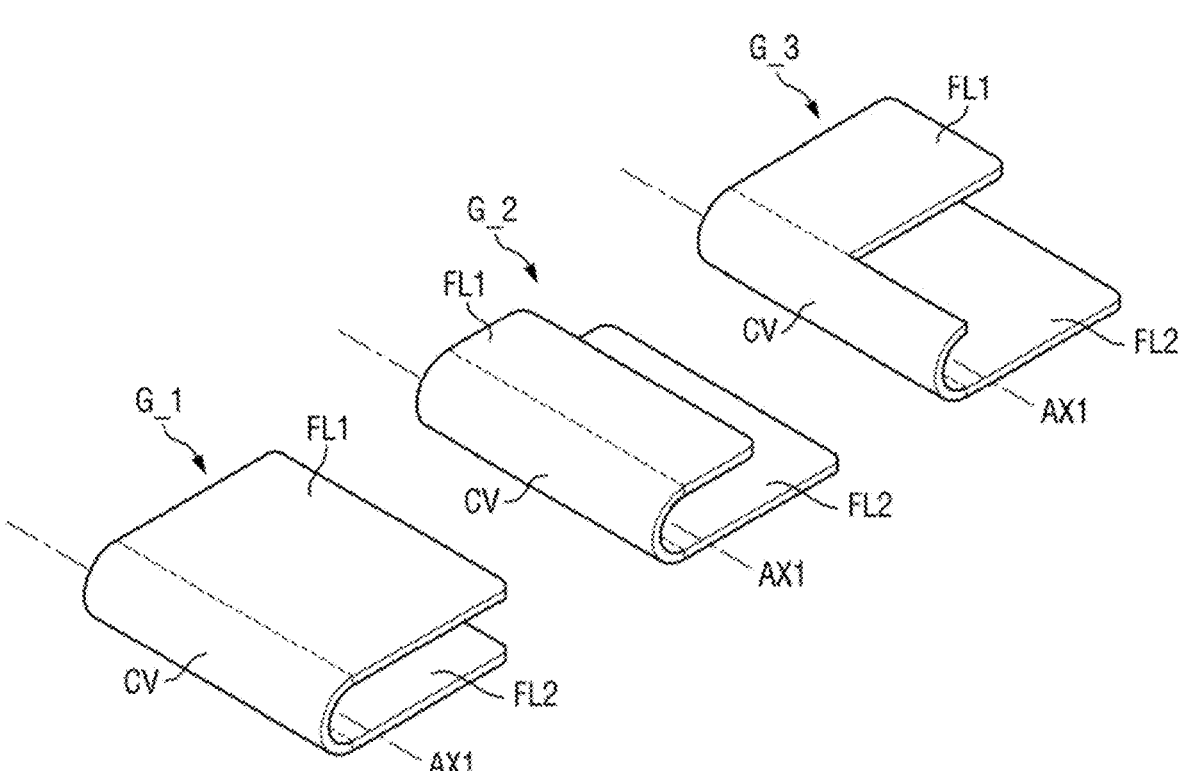
FIG. 1 is a perspective view illustrating a glass product relating to a glass polishing apparatus according to an embodiment of the present disclosure.
Figure 2:
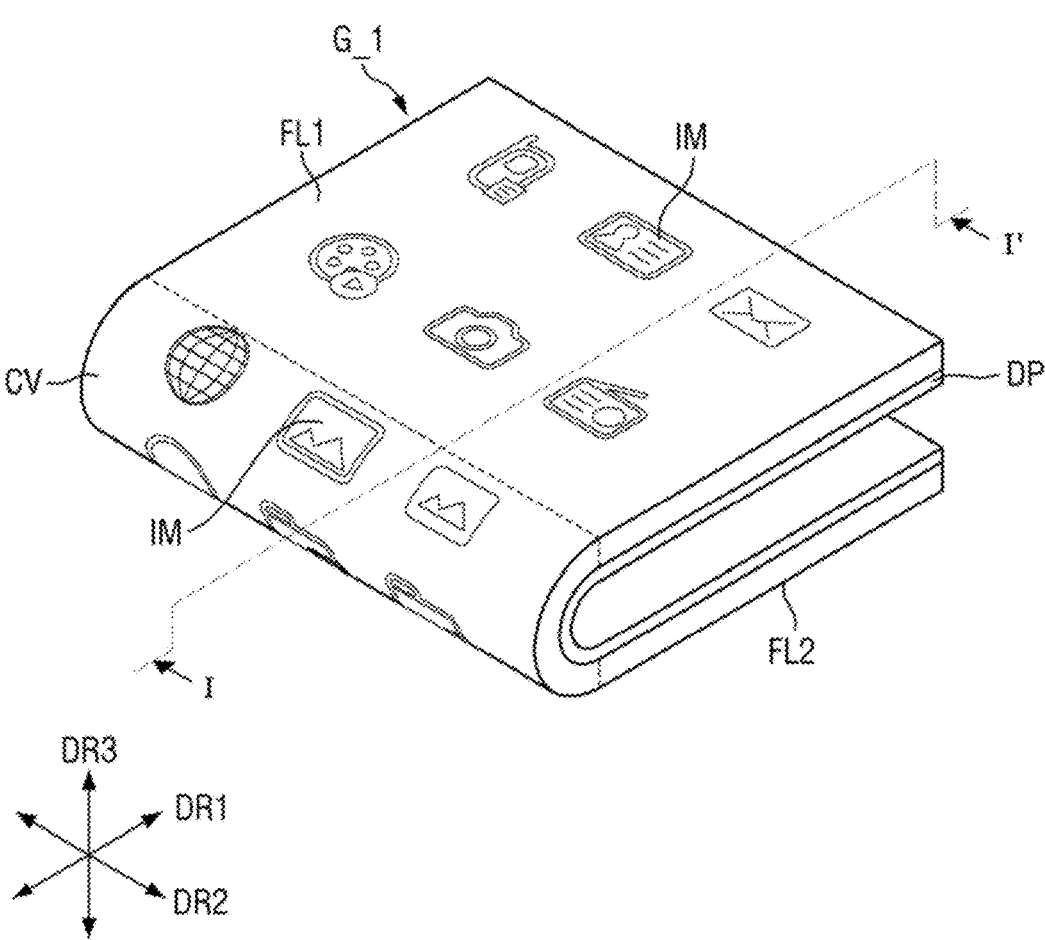
FIG. 2 is a perspective view illustrating a glass product to which a display panel is attached.
Figure 3:
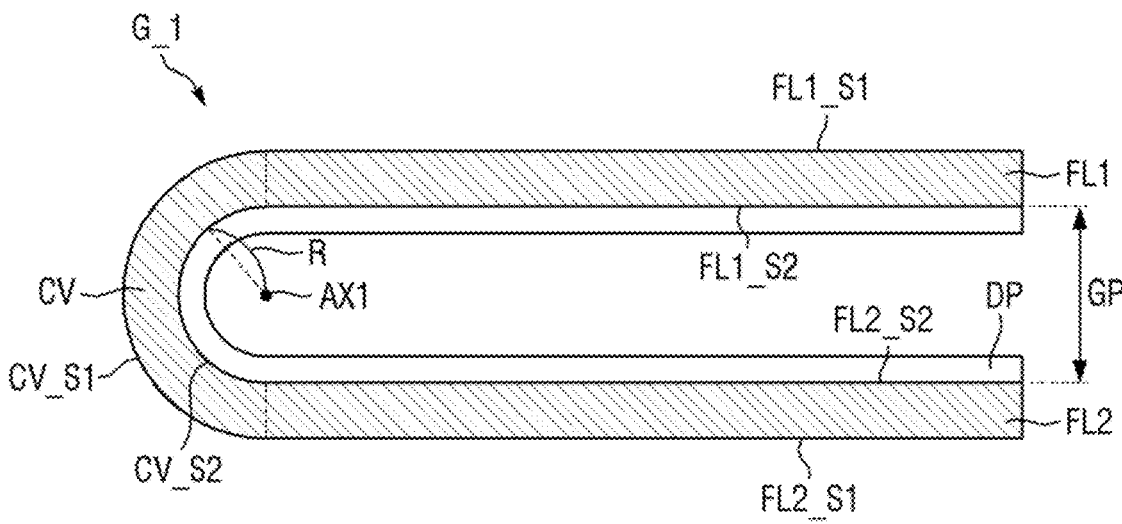
FIG. 3 is a cross-sectional view taken along line I-I' of FIG. 2.
Figure 4:
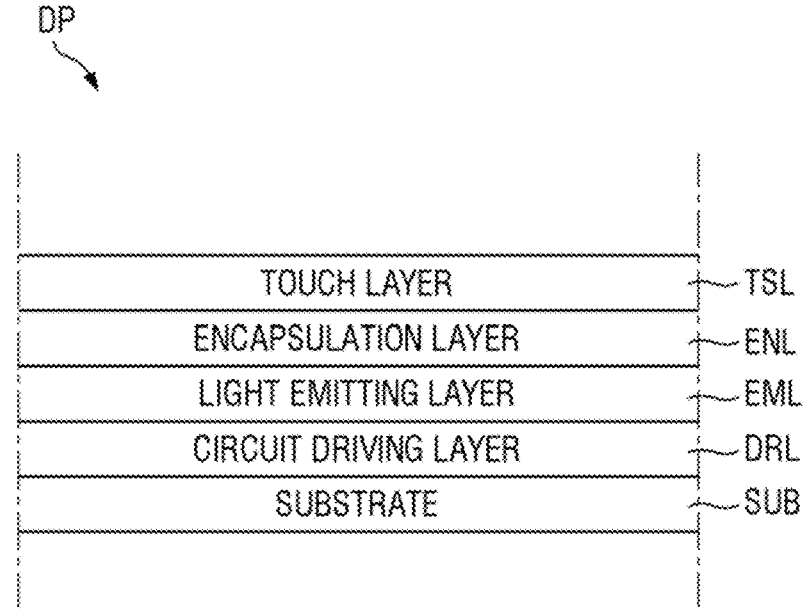
FIG. 4 is a cross-sectional view illustrating a display panel of FIG. 3.
Figure 5:
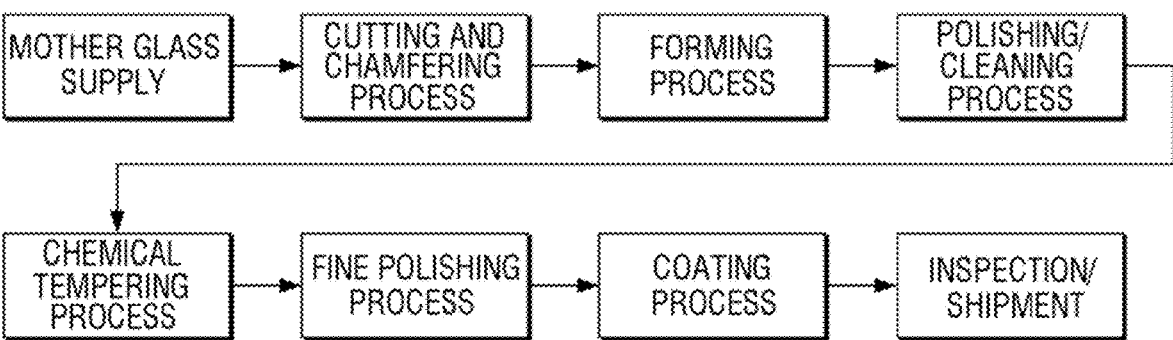
FIG. 5 is a flowchart illustrating a process of manufacturing the glass product of FIG. 1.

FIG. 1 is a perspective view illustrating a glass product relating to a glass polishing apparatus according to an embodiment of the present disclosure. FIG. 2 is a perspective view illustrating a glass product to which a display panel is attached. FIG. 3 is a cross-sectional view taken along line I-I' of FIG. 2. FIG. 4 is a cross-sectional view illustrating a display panel of FIG. 3. FIG. 5 is a flowchart of a process of manufacturing the glass product of FIG. 1.

A glass product G (e.g., a glass structure) is used as a window for protecting a display, a substrate for a display panel, a substrate for a touch panel, or an optical member such as a light guide plate in electronic devices including a display such as a refrigerator or a washing machine which includes a display screen, as well as a tablet computer, a laptop/notebook personal computer (PC), a smartphone, an e-book reader, a television, and a PC monitor. Glass may also be used as a cover glass of a vehicle dashboard or the like, a cover glass for a solar cell, an interior material of a construction material, or a window of a building or a house. The glass product G may include glass that is tempered or otherwise treated by a chemical tempering process which will be described below.

Referring to FIG. 1, the glass product G may have a substantially rectangular shape in a plan view, but the present disclosure is not necessarily limited thereto. The glass product G may have various shapes such as a rectangular shape with round corners, a square shape, a circular shape, or an elliptical shape. For example, a corner of the glass product G may include a round portion that has a radius of curvature in a range of about 10 mm to 12 mm. As illustrated in FIG. 1, a portion of the glass product G may be bent or folded to face the other portion. Accordingly, the glass product G may have a U-shaped or C-shaped cross-section.

The glass product G may have various shapes. For example, the glass product G may include a first glass product G_1 in which a first flat portion FL1 and a second flat portion FL2, which will be described below, have the same size, a second glass product G_2 in which a length of a first flat portion FL1 in one direction is smaller than a length of a second flat portion FL2 in the one direction, and a third glass product G_3 in which a length of a first flat portion FL1 in the other direction is smaller than a length of a second flat portion FL2 in the other direction. However, such shapes of the glass product G are only illustrative, and the shape of the glass product G is not necessarily limited to the examples described herein.

Hereinafter, for convenience of description, the first glass product G_1 in which the first flat portion FL1 and the second flat portion FL2 have the same size will be mainly described, but features of the first glass product G_1 that will be described below may be applied to the other glass products G_2 and G_3 within the scope sharing the technical idea.

Referring to FIGS. 1 to 3, the glass product G may include the first flat portion FL1, the second flat portion FL2, and a curved portion CV.

The first flat portion FL1 and the second flat portion FL2 are disposed to face each other. The first flat portion FL1 and the second flat portion FL2 may be spaced apart from each other in a thickness direction. For example, a gap between the first flat portion FL1 and the second flat portion FL2 may be in a range of about 6 mm to 10 mm.

The first flat portion FL1 and the second flat portion FL2 may be parallel to each other. For example, the first flat portion FL1 and the second flat portion FL2 may be parallel to each other so that a gap GP between the first flat portion FL1 and the second flat portion FL2 is constant. As an example, an angle formed between the first flat portion FL1 and the second flat portion FL2 may be about 0°. The first flat portion FL1 and the second flat portion FL2 may be inclined with respect to each other. In this case, the gap GP between the first flat portion FL1 and the second flat portion FL2 may vary. For example, the gap GP between the first flat portion FL1 and the second flat portion FL2 may gradually decrease or increase in a direction toward the curved portion CV. As an example, a gap GP between one side of the first flat portion FL1 and one side of the second flat portion FL2 that are connected to the curved portion CV may be smaller or larger than a gap GP between an end portion of the first flat portion FL1 and an end portion of the second flat portion FL2. As an example, the angle formed between the first flat portion FL1 and the second flat portion FL2 may be larger than about 0° and less than 180°. As an example, the angle formed between the first flat portion FL1 and the second flat portion FL2 may be larger than about 0° and less than 90°. As an example, the angle formed between the first flat portion FL1 and the second flat portion FL2 may be larger than about 0° and less than 15°. As an example, a difference between the gap GP between the one side of the first flat portion FL1 and the one side of the second flat portion FL2 that are connected to the curved portion CV and the gap GP between the end portion of the first flat portion FL1 and the end portion of the second flat portion FL2 may be in a range of about 5 mm to 10 mm.

The first flat portion FL1 and the second flat portion FL2 may completely overlap or partially overlap each other in the thickness direction. The first flat portion FL1 and the second flat portion FL2 may have the same size or different sizes as each other. A length of the first flat portion FL1 and/or the second flat portion FL2 in one direction may be larger than or equal to a length thereof in the other direction. For example, the length of the first flat portion FL1 and/or the second flat portion FL2 in one direction may be in a range of about 70 mm to 90 mm, and the length thereof in the other direction may be in a range of about 60 mm to 80 mm. Here, the one direction may be a direction that is perpendicular or orthogonal to a first axis AX1, and the other direction may be a direction parallel to the first axis AX1.

The curved portion CV connects one side of the first flat portion FL1 to one side of the second flat portion FL2. The curved portion CV may have a curvature that is convex with respect to an outward direction. The curved portion CV may be bent to have a predetermined radius of curvature R with respect to the first axis AX1. For example, the radius of curvature R may be in a range of about 3 mm to 5 mm.

The length of the first flat portion FL1 and the second flat portion FL2 in the other direction may be larger than or equal to an outer diameter and/or an inner diameter of the curved portion CV. For example, the length of the first flat portion FL1 and the second flat portion FL2 in the other direction may be larger than or equal to about two times the outer diameter and/or inner diameter of the curved portion CV. As an example, the length of the first flat portion FL1 and the second flat portion FL2 in the other direction may be larger than or equal to about six times the outer diameter and/or inner diameter of the curved portion CV. The other direction may be a direction in which the first flat portion FL1 and/or the second flat portion FL2 extend from an end portion of the curved portion CV.

Referring to FIG. 3, the glass product G may include an outer side surface and an inner side surface. The inner side surface may be a surface that comes in contact with a space surrounded by the glass product G, and the outer side surface may be a surface opposite to the inner side surface. The inner side surface may be disposed so that at least some portions thereof face each other. The outer side surface may constitute an exterior of the glass product G.

For example, as illustrated in FIG. 3, the outer side surface may include a convex surface CV_S1 of the curved portion CV and one surface FL1_S1 of the first flat portion FL1 and one surface FL2_S1 of the second flat portion FL2 that are connected to the convex surface CV_S1, and the inner side surface may include a concave surface CV_S2 of the curved portion CV and the other surface FL1_S2 of the first flat portion FL1 and the other surface FL2_S2 of the second flat portion FL2 that are connected to the concave surface CV_S2.

The outer side surface and the inner side surface may be defined differently according to the shape of the glass product G. The outer side surface may include the convex surface CV_S1 of the curved portion CV and a surface that is adjacent and connected thereto, and the inner side surface may include the concave surface CV_S2 of the curved portion CV and a surface that is adjacent and connected thereto.

A display panel DP may be disposed at the inner side surface of the glass product G. The display panel DP may display a screen or an image. The display panel DP may be flexible and may be bent corresponding to the shape of the inner side surface of the glass product G. The display panel DP may include a light-receiving display panel, such as a liquid crystal display (LCD) panel and an electrophoretic display (EPD) panel, as well as a self-light-emitting display panel, such as an organic light emitting diode (OLED) display panel, an inorganic electroluminescent (EL) display panel, a quantum-dot light emitting display (QED) panel, a micro-LED panel, a nano-LED panel, a plasma display panel (PDP), a field emission display (FED) panel, and/or a cathode ray tube (CRT) display panel.

Referring to FIGS. 1 to 3, a polishing process may be performed on the glass product G.

For example, as illustrated in FIG. 5, the glass product G may be manufactured through a mother glass supply process in which a large plate-shaped mother glass is supplied, a cutting and chamfering process in which the supplied mother glass is cut, chamfered, and cleaned, a forming process in which the cut glass is bent, a polishing/cleaning process in which the bent glass is polished and cleaned, a chemical tempering process in which the cleaned glass is added into a molten salt, such as potassium nitrate, to chemically temper the cleaned glass through an ion exchange, a fine polishing process in which the tempered glass is finely polished to adjust dimension, a coating process in which the finely polished glass is coated with a print layer or coated to prevent fingerprints and/or prevent reflection, and an inspection and shipment process. In some cases, at least one or more of the above processes may be omitted, or at least one or more other processes may be added. For example, the fine polishing process may be omitted.

In the polishing/cleaning process, the inner side surface of the glass product G may be polished. For example, in the forming process, a central region of the mother glass that corresponds to the curved portion CV of the glass product G may be heated and bent. Thus, the inner side surface of the glass product G, particularly, the inner side surface of the curved portion CV, has a rough surface due to being heated and bent. Accordingly, prior to the chemical tempering process, a process, in which the curved portion CV of the glass product G, particularly, the inner side surface of the curved portion CV, is polished and foreign matter formed due to the previous processes is washed off, is required. The polishing process may be performed by a glass polishing apparatus 1 which will be described below with reference to FIGS. 3 to 18.

Figure 6:
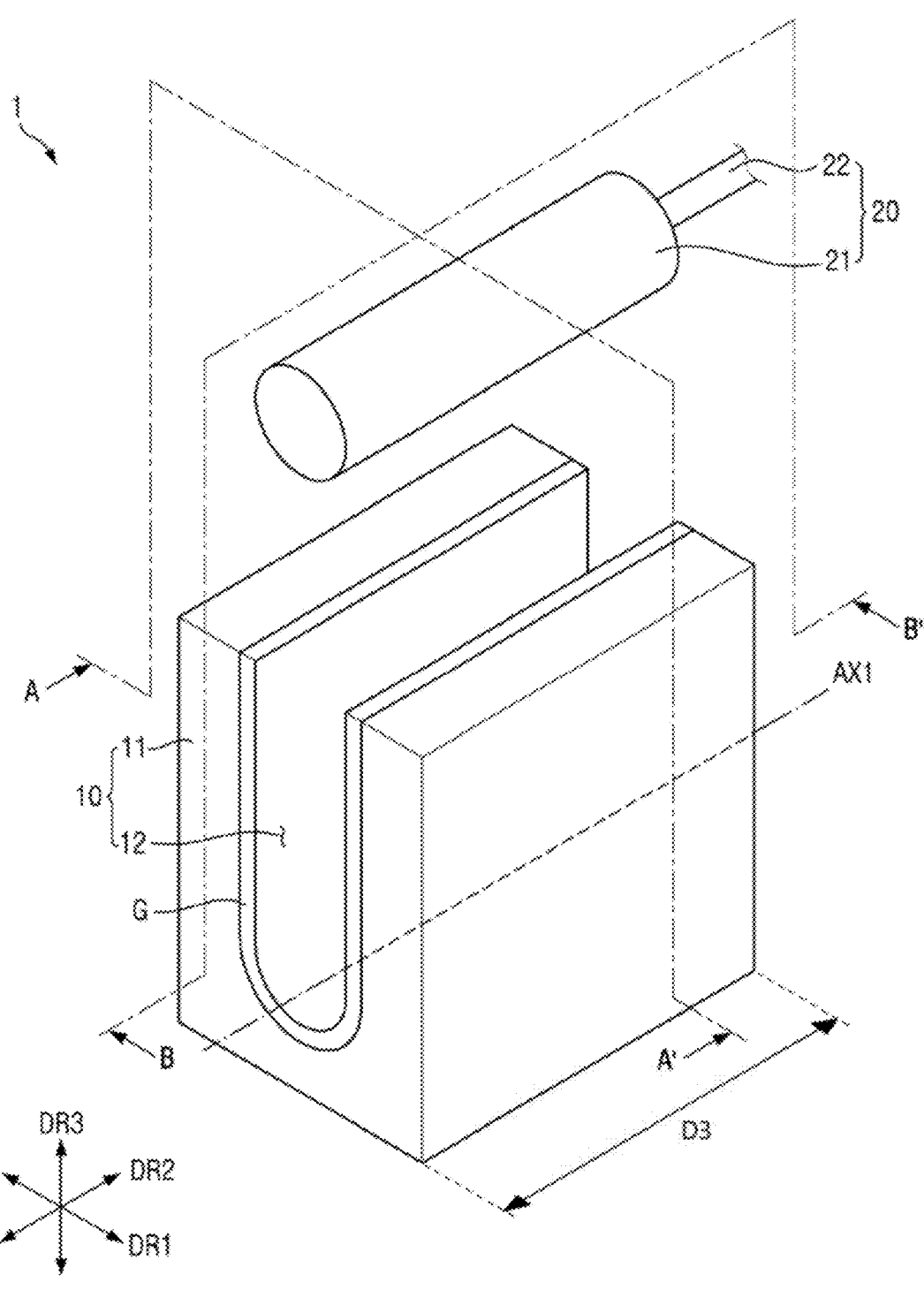
FIG. 6 is a perspective view illustrating a glass polishing apparatus according to an embodiment of the present disclosure.
Figure 7:
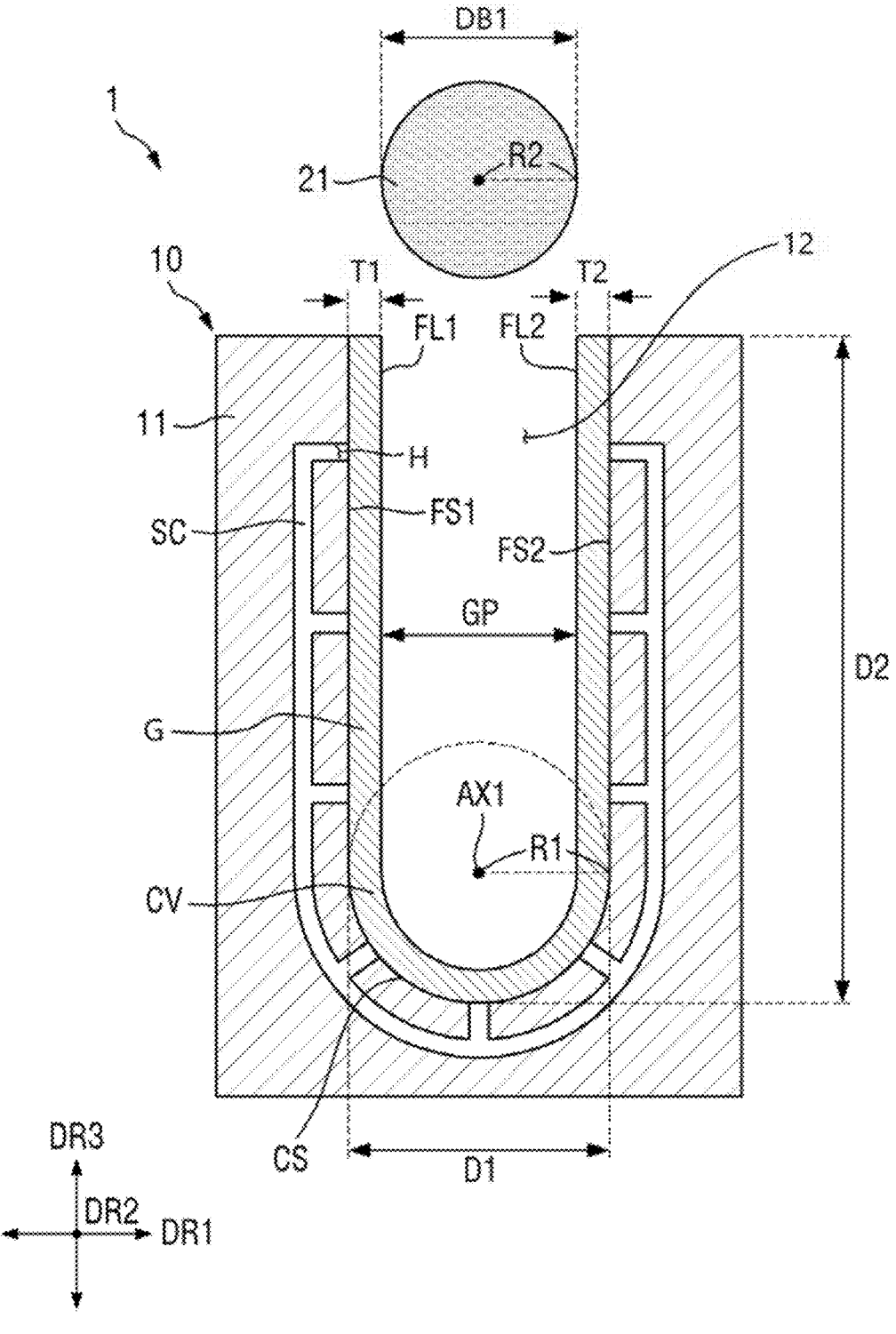
FIG. 7 is a cross-sectional view taken along line A-A' of FIG. 6.
Figure 8:
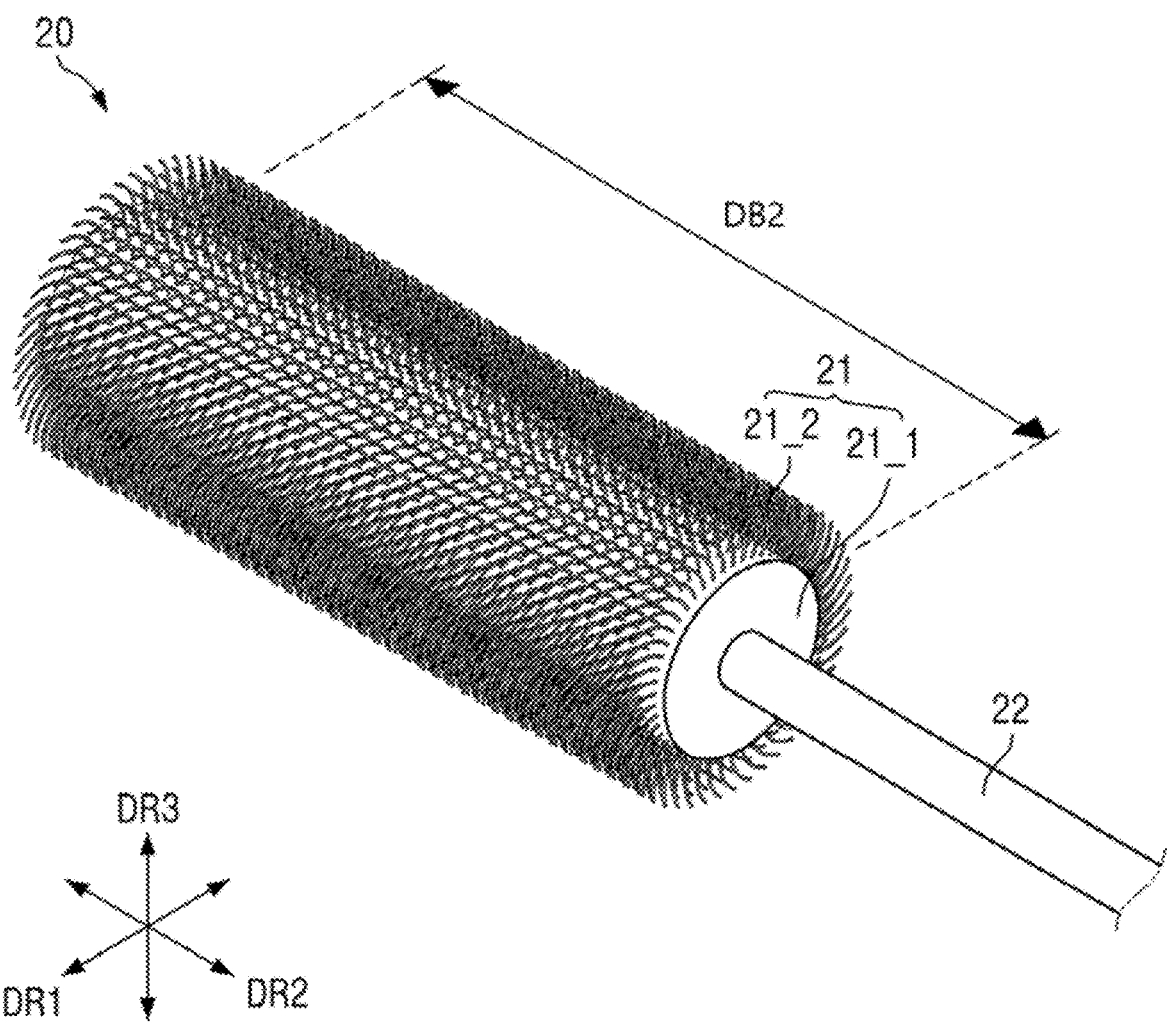
FIG. 8 is a perspective view illustrating an enlarged view illustrating a roller unit of FIG. 4.
Figure 9:
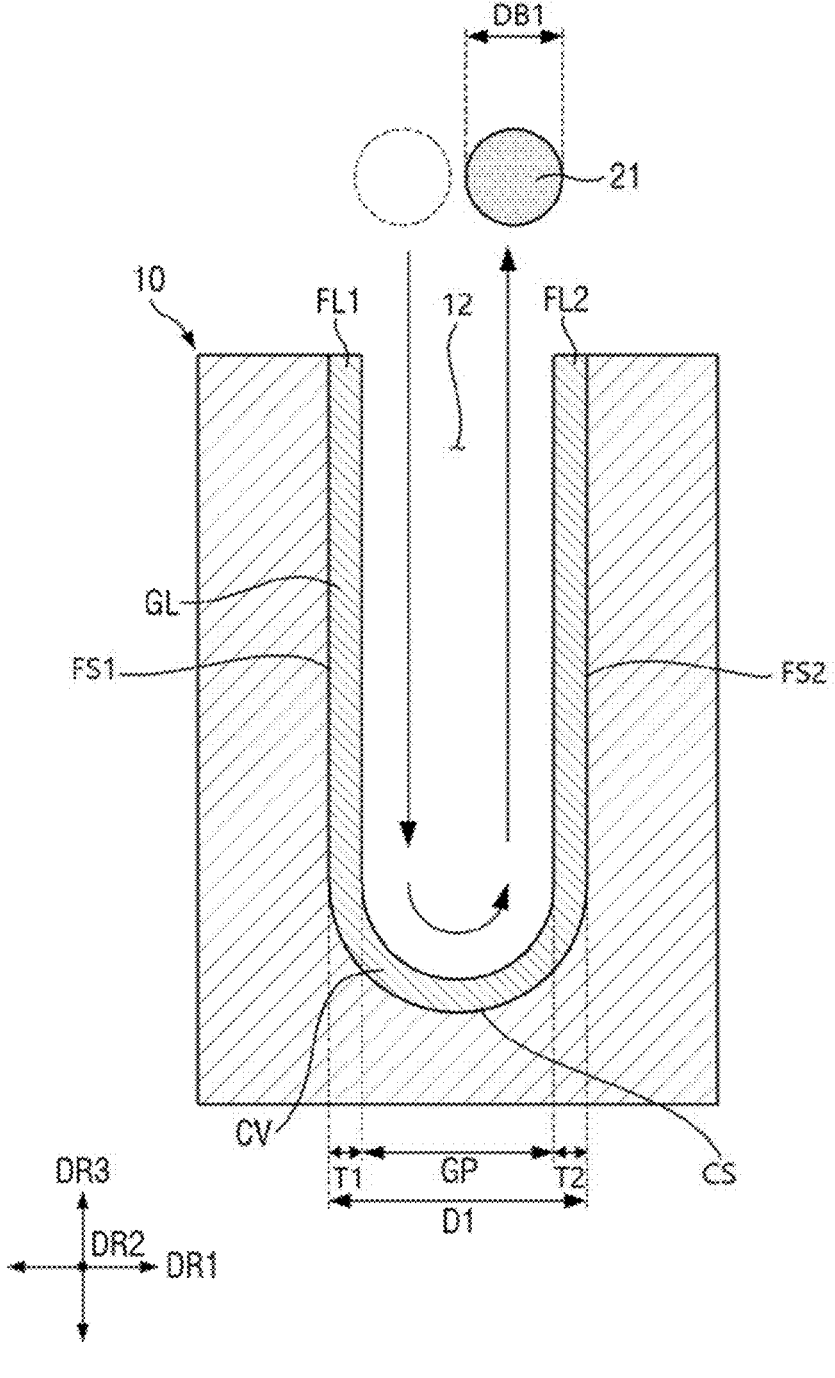
FIGS. 9 to 11 are cross-sectional views illustrating an operation of a roller unit of FIG. 6.
Figure 10:
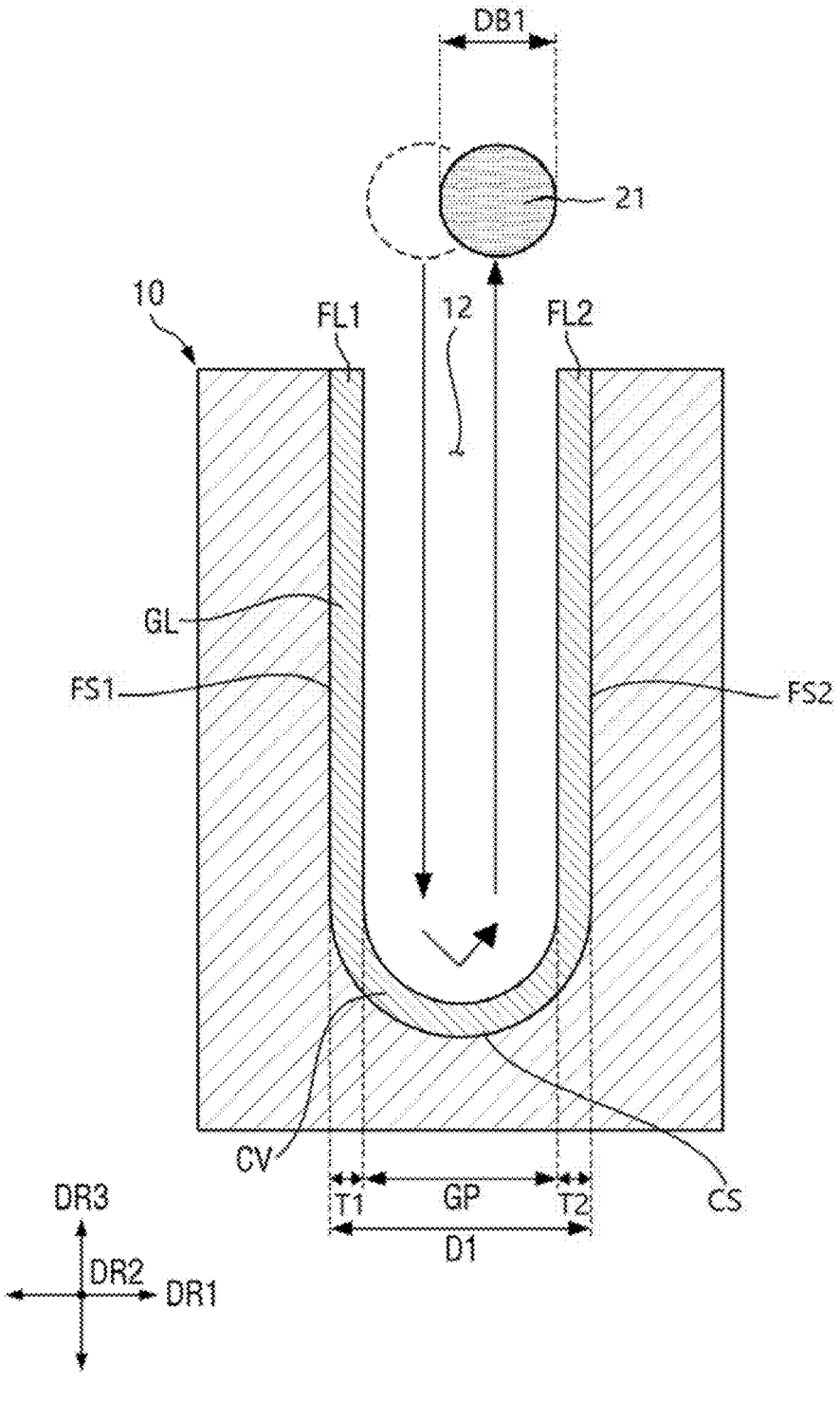
Figure 11:
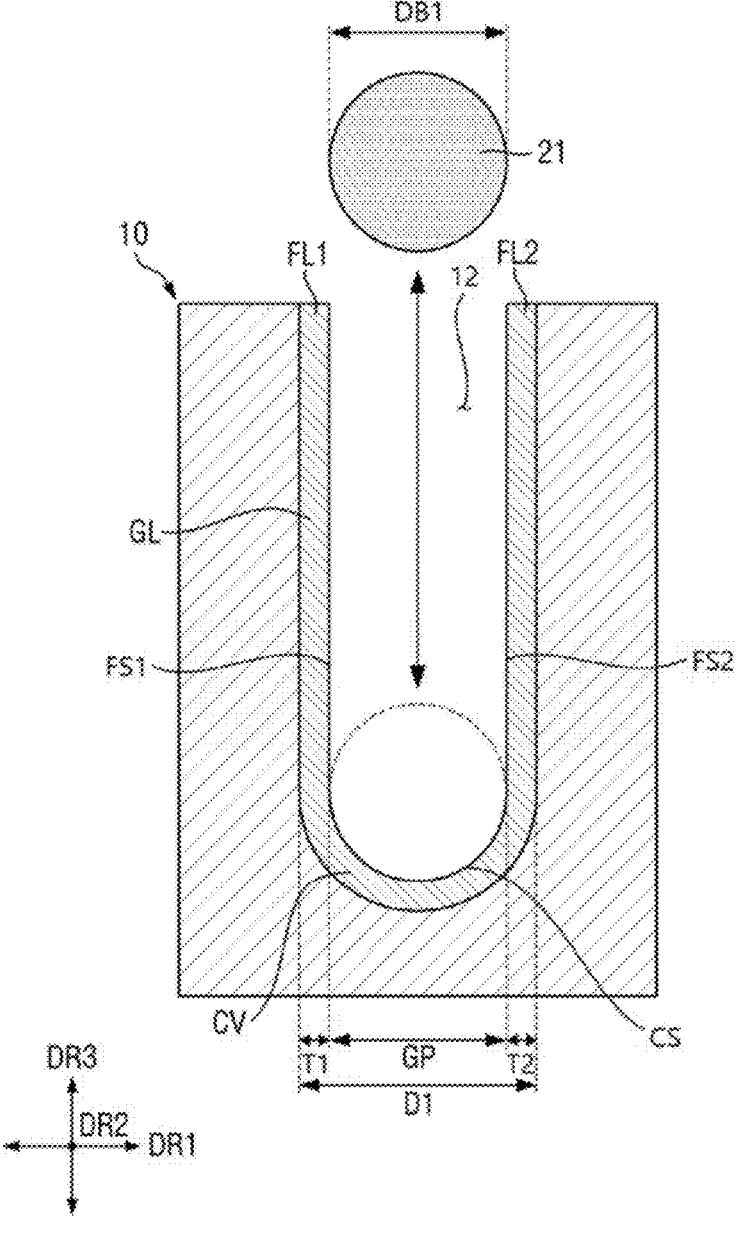

FIG. 6 is a perspective view illustrating a glass polishing apparatus 1 according to an embodiment of the present disclosure. FIG. 7 is a cross-sectional view taken along line A-A' of FIG. 6. FIG. 8 is a perspective view illustrating an enlarged view illustrating a roller unit of FIG. 4. FIGS. 9 to 11 are cross-sectional views illustrating an operation of a roller unit 20 of FIG. 6.

Hereinafter, a first direction DR1, a second direction DR2, and a third direction DR3 are different directions that intersect each other. For example, the first direction DR1 may be a horizontal direction, the second direction DR2 may be a vertical direction, and the third direction DR3 may be a height direction (thickness direction). The third direction DR3 may include an upward direction, which is a direction toward an upper side in FIG. 3, and a downward direction, which is a direction toward a lower side in FIG. 3. Also, hereinafter, for convenience of description, a surface disposed to face the upper side in FIG. 3 may be referred to as "upper surface," and a surface disposed to face the lower side in FIG. 3 may be referred to as "lower surface." The directions are only illustrative, and the following embodiments are not necessarily limited thereby.

Hereinafter, the first glass product G_1 of FIG. 1 will be described as an example of an object to be polished by the glass polishing apparatus 1. However, the object to be polished by the glass polishing apparatus 1 may include the second glass product G_2 and the third glass product G_3 of FIG. 1, and the shapes of the object to be polished are not necessarily limited to the shapes of the glass products G_1, G_2, and G_3 of FIG. 1.

Referring to FIGS. 6 to 8, the glass polishing apparatus 1 may include a jig 10 and a roller unit 20 disposed at an upper side of the jig 10.

The jig 10 holds an object to be polished. The jig 10 may have a shape that corresponds to the shape of the object to be polished. The object to be polished may include a glass product G that is folded or bent in a U-shape so that a portion of the glass product G faces the other portion thereof. For example, the object to be polished may be the glass product G of FIG. 1.

The jig 10 may be elastic and include a material that is able to, using surface friction, tightly support the object to be polished. For example, the material may include a poly-based urethane material. The urethane material may include foamed urethane and non-foamed urethane. As an example, the material may include polyurethane including at least one of cerium, cerium oxide, and silicon carbide.

In one embodiment of the present disclosure, the jig 10 may have a rectangular-parallelepiped shape, not including a holding groove 12 formed therein, but the shape of the jig 10 is not necessarily limited thereto.

The jig may include a body 11 and the holding groove 12.

The holding groove 12 may be recessed from one side surface of the body 11. In one embodiment of the present disclosure, the one side surface of the body 11 may be an upper surface of the body 11. At least a portion of the glass product G may be inserted into the holding groove 12. In one embodiment of the present disclosure, the glass product G may be completely inserted into the holding groove 12.

The holding groove 12 may have a width D1 in the first direction DR1. The width D1 of the holding groove 12 may be larger than or equal to a width of the glass product G in the first direction DR1. The width of the glass product G in the first direction DR1 may be the sum of a thickness T1 of the first flat portion FL1 of the glass product G, a thickness T2 of the second flat portion FL2, and the gap GP between the first flat portion FL1 and the second flat portion FL2. The width D1 of the holding groove 12 may be larger than or equal to a width or diameter of a brush 21 and/or a cylinder 21_1, which will be described below, in the first direction DR1. In some embodiments of the present disclosure, the width D1 of the holding groove 12 may be larger than the diameter of the cylinder 21_1 and smaller than a diameter DB1 of the brush 21 in which a plurality of bristles 21_2 are arranged on an outer circumferential surface of the cylinder 21_1. For example, the width D1 of the holding groove 12 may be smaller than the diameter DB1 of the brush 21 taking into account the height of the plurality of bristles 21_2. The width D1 of the holding groove 12 may be larger than or equal to the sum of the thickness T1 of the first flat portion FL1 of the glass product G, the thickness T2 of the second flat portion FL2, and the diameter DB1 of the brush 21. The thickness T1 of the first flat portion FL1 and the thickness T2 of the second flat portion FL2 may be the same.

The holding groove 12 may have a depth D2 in the third direction DR3. In one embodiment of the present disclosure, the depth D2 of the holding groove 12 may be larger than or equal to the width D1 of the holding groove 12. For example, the depth D2 of the holding groove 12 may be larger than or equal to six times the width D1 of the holding groove 12. As an example, the depth D2 of the holding groove 12 may be in a range of about 50 mm to 100 mm, and the width D1 of the holding groove 12 may be in a range of about 5 mm to 10 mm.

The holding groove 12 may have a predetermined length D3 in the second direction DR2. Here, one side of the holding groove 12 in the second direction DR2 and the other side that is opposite to the one side may be open. For example, as illustrated in FIG. 6, the upper side, front side, and rear side of the holding groove 12 may be open. The length D3 of the holding groove 12 may be larger than or equal to the depth D2 of the holding groove 12. For example, the length D3 of the holding groove 12 may be larger than or equal to six times the width D1 of the holding groove 12. As an example, the length D3 of the holding groove 12 may be in a range of about 50 mm to 100 mm.

The holding groove 12 may have a shape that corresponds to the outer side surface of the object to be polished.

The holding groove 12 may include a first holding surface FS1, a second holding surface FS2, and a third holding surface CS.

The first holding surface FS1 may hold the first flat portion FL1 of the glass product G, the second holding surface FS2 may hold the second flat portion FL2 of the glass product G, and the third holding surface CS may hold the curved portion CV of the glass product G.

The first holding surface FS1 and the second holding surface FS2 may extend in a straight line in the third direction DR3. In one embodiment of the present disclosure, the third direction DR3 may be a vertical direction. In some embodiments of the present disclosure, the third direction DR3 may be a direction inclined with respect to the vertical direction. The first holding surface FS1 and the second holding surface FS2 may have a shape that corresponds to the outer side surface of the first flat portion FL1 of the glass product G of FIG. 1 and a shape that corresponds to the outer side surface of the second flat portion FL2, respectively. Edges of the first holding surface FS1 and the second holding surface FS2 may be aligned with edges of the first flat portion FL1 and the second flat portion FL2. In one embodiment of the present disclosure, the first holding surface FS1 and the second holding surface FS2 may be parallel to each other. In some embodiments of the present disclosure, the first holding surface FS1 may be inclined with respect to the second holding surface FS2. In one embodiment of the present disclosure, a gap between the first holding surface FS1 and the second holding surface FS2 in the first direction DR1 may be less than or equal to a length of each of the first holding surface FS1 and the second holding surface FS2 in the third direction DR3. In one embodiment of the present disclosure, the length of the first holding surface FS1 in the third direction DR3 and the length of the second holding surface FS2 in the third direction DR3 may be the same. In some embodiments of the present disclosure, the length of the first holding surface FS1 in the third direction DR3 and the length of the second holding surface FS2 in the third direction DR3 may be different.

The third holding surface CS may connect one side of the first holding surface FS1 and one side of the second holding surface FS2. The third holding surface CS may connect a lower end of the first holding surface FS1 and a lower end of the second holding surface FS2. In one embodiment of the present disclosure, the third holding surface CS may include a concave surface that has a predetermined radius of curvature with respect to one center of curvature. The radius of curvature may be larger than or equal to the outer diameter of the curved portion CV of the glass product G. The center of curvature may be the same as the center of curvature of the curved portion CV of the glass product G. For example, the center of curvature may be the first axis AX1 of the glass product G.

The holding groove 12 may further include a hole H that passes through at least one of the first holding surface FS1, the second holding surface FS2, and the third holding surface CS.

The hole H may be provided as a plurality of holes H disposed at predetermined intervals on the first holding surface FS1, the second holding surface FS2, and/or the third holding surface CS. The hole H may adsorb and fix the glass product G held in the holding groove 12 by applying suction thereto. The hole H may pass through an inner portion of the jig 10 to form an internal flow path SC inside the jig 10. A vacuum or negative pressure may be formed in the internal flow path SC to allow the glass product G to be adsorbed onto the holding groove 12. In one embodiment of the present disclosure, the hole H may be disposed in all of the first holding surface FS1, the second holding surface FS2, and the third holding surface CS. In some embodiments of the present disclosure, the hole H may be disposed only in the first holding surface FS1 and the second holding surface FS2. In some embodiments of the present disclosure, the hole H may be disposed only in the third holding surface CS.

In some embodiments of the present disclosure, the glass polishing apparatus 1 may further include a jig mover (e.g., an actuator) configured to move the jig 10 in at least one direction. For example, the jig mover may be implemented as a three-axis stage that includes a linear movement guide.

The roller unit 20 is disposed at the upper side of the jig 10 so as to be movable in at least one direction. For example, the roller unit 20 may move up or down in the third direction DR3 so that at least a portion of the roller unit 20 is inserted into or ejected from the holding groove 12 of the jig 10.

The roller unit 20 may include the brush 21 and a rod 22 that are arranged in a direction in which the holding groove 12 is formed at an upper surface of the jig 10. In one embodiment of the present disclosure, the direction in which the holding groove 12 is formed may be the second direction DR2.

The brush 21 may have a substantially cylindrical shape. In one embodiment of the present disclosure, a length DB2 of the brush 21 in the second direction DR2 may be less than or equal to the length D3 of the holding groove 12 in the second direction DR2. The brush 21 may have the diameter DB1, which is less than or equal to the width D1 of the holding groove 12, and be inserted into or ejected from the holding groove 12. For example, the diameter DB1 of the brush 21 may be in a range of 2 mm to 7 mm. The brush 21 may be driven to rotate clockwise or counterclockwise with respect to the rod 22 extending in the second direction DR2. For example, the brush 21 may rotate at a speed in a range of 5 rpm/min to 30 rpm/min. The brush 21 may oscillate. In one embodiment of the present disclosure, rotation and oscillation of the brush 21 may be alternately performed to minimize scratches due to polishing.

In one embodiment of the present disclosure, the diameter DB1 of the brush 21 (e.g., the width thereof in the first direction DR1) may be smaller than the gap between the first flat portion FL1 and the second flat portion FL2 of the glass product G in the first direction DR1. For example, a difference between the gap between the first flat portion FL1 and the second flat portion FL2 and the diameter DB1 of the brush 21 may be larger than or equal to about 1 mm. As an example, the gap between the first flat portion FL1 and the second flat portion FL2 may be about 8 mm, and the diameter DB of the brush 21 may be in a range of about 2 mm to 7 mm. The gap between the first flat portion FL1 and the second flat portion FL2 may be a value obtained by subtracting the thickness T1 of the first flat portion FL1 and the thickness T2 of the second flat portion FL2 from a distance between the first holding surface FS1 and the second holding surface FS2. The thickness T1 of the first flat portion FL1 and the thickness T2 of the second flat portion FL2 may be in a range of about 0.3 mm to 0.7 mm.

In some embodiments of the present disclosure, the diameter DB1 of the brush 21 (e.g., the width thereof in the first direction DR1) may be substantially the same as the gap between the first flat portion FL1 and the second flat portion FL2 in the first direction DR1.

As illustrated in FIG. 8, the brush 21 may include the cylinder 21_1 and the plurality of bristles 21_2.

The cylinder 21_1 may include a polishing pad. The polishing pad may be disposed at an outer circumferential surface of the cylinder 21_1. The polishing pad may include polyurethane. The polishing pad may further include a polishing material. The polishing material may further include at least one of cerium, cerium oxide, and silicon carbide. In some embodiments of the present disclosure, the polishing material may also be separately supplied into the holding groove 12 during the polishing process.

The plurality of bristles 21_2 are disposed at the outer circumferential surface of the cylinder 21_1. The plurality of bristles 21_2 may surround the outer circumferential surface of the cylinder 21_1.

The rod 22 extends in the second direction DR2 and is coupled to one side of the cylinder 21_1. The rod 22 may provide torque for rotation of the brush 21. In some embodiments of the present disclosure, the glass polishing apparatus 1 may further include a roller unit driver configured to provide power for rotation of the brush 21 and the rod 22.

In some embodiments of the present disclosure, the glass polishing apparatus 1 may further include a roller unit mover configured to move the roller unit 20. The roller unit mover may be implemented by a cylinder using a hydraulic or pneumatic pressure, a three-axis stage including a linear movement guide, or the like. In some embodiments of the present disclosure, the glass polishing apparatus 1 may further include a controller configured to control operation of the roller unit driver and the roller unit mover.

Referring to FIGS. 9 to 11, as described above, the roller unit 20 may be movable in at least one direction. For example, the roller unit 20 may move downward so that the roller unit 20 is inserted into the holding groove 12 of the jig 10 from the outside of the holding groove 12, may polish the inner side surface of the glass product G, and then may move back upward and be ejected to the outside of the holding groove 12.

As illustrated in FIGS. 9 to 11, the brush 21 may move along the shapes of the first holding surface FS1, the second holding surface FS2, and the third holding surface CS (e.g., along the shapes of the first flat portion FL1, the second flat portion FL2, and the curved portion CV). In this case, the brush 21 may move while a predetermined gap is maintained with the first holding surface FS1, the second holding surface FS2, and the third holding surface CS. For example, the brush 21 may move while a central axis of the brush 21 maintains a predetermined gap with the first holding surface FS1, the second holding surface FS2, and the third holding surface CS. In some embodiments of the present disclosure, the brush 21 may also move while a gap with the first holding surface FS1, the second holding surface FS2, and the third holding surface CS varies. The movement of the brush 21 may change according to the diameter DB1 of the brush 21 and the width D1 of the holding groove 12. The diameter DB1 of the brush 21 may include a diameter of the cylinder 21_1. Referring to FIG. 9, in a case in which the diameter DB1 of the brush 21 is smaller than the width D1 of the holding groove 12, for example, the brush 21 may move along a substantially U-shaped movement path. In this case, the diameter DB1 of the brush 21 may be less than or equal to half of the width D1 of the holding groove 12.

The brush 21 moves downward along the flat shape of the first holding surface FS1 (e.g., the inner side surface of the first flat portion FL1) from one side of the first holding surface FS1 toward the other side of the first holding surface FS1 to polish the inner side surface of the first flat portion FL1 of the glass product G.

Then, the brush 21 moves in a curved path, e.g., a C-shaped path, along the curved shape of the third holding surface CS (e.g., the inner side surface of the curved portion CV) from one side of the third holding surface CS, which is connected to the other side of the first flat portion FL1, toward the other side of the third holding surface CS, which is connected to the one side of the second flat portion FL2, to polish the concave inner side surface of the curved portion CV.

Then, the brush 21 moves along the second holding surface FS2 (e.g., the inner side surface of the second flat portion FL2) from one side of the second holding surface FS2, which is connected to the other side of the third holding surface CS, toward the other side of the second holding surface FS2 to polish the inner side surface of the second holding surface FS2.

For example, the brush 21 may be driven to move in at least one direction of the first direction DR1, the second direction DR2, the third direction DR3, and a diagonal direction including two or more of the first direction DR1, second direction DR2, and third direction DR3. The first direction DR1 and/or second direction DR2 may be a horizontal direction, and the third direction DR3 may be a vertical direction.

In some embodiments of the present disclosure, the brush 21 may move up and down without coming in contact with the first flat portion FL1 and the second flat portion FL2 of the glass product G and may polish only the curved portion CV of the glass product G. For example, according to driving of the brush 21, all of the first flat portion FL1, the second flat portion FL2, and the curved portion CV of the glass product G may be polished, or at least one of the first flat portion FL1, the second flat portion FL2, and the curved portion CV may be selectively polished.

In some embodiments of the present disclosure, the order of polishing the first flat portion FL1, the second flat portion FL2, and the curved portion CV may be changed. For example, the brush 21 may move along the curved portion CV, the first flat portion FL1, and the second flat portion FL2 in this order.

Referring to FIG. 10, in a case in which the diameter DB of the brush 21 is larger than that in the case of FIG. 9, the brush 21 may move differently on the third holding surface CS (e.g., the inner side surface of the curved portion CV). In this case, the diameter DB1 of the brush 21 may be smaller than the width D1 of the holding groove 12 but larger than or equal to half of the width D1 of the holding groove 12. For example, after the first flat portion FL1 is polished, the brush 21 may move along a substantially V-shaped movement path from the one side of the third holding surface CS, which is connected to the other side of the first flat portion FL1, toward the other side of the third holding surface CS, which is connected to the one side of the second flat portion FL2. However, the shape of the movement path of the brush 21 is only illustrative, and the movement path of the brush 21 on the third holding surface CS (e.g., the inner side surface of the curved portion CV) may have various shapes including a straight line and/or a curved line.

Referring to FIG. 11, in a case in which the diameter DB1 of the brush 21 is substantially the same as the width D1 of the holding groove 12, the brush 21 may reciprocate in a straight line. For example, the brush 21 moves downward toward the third holding surface CS (e.g., the curved portion CV) to polish the concave inner side surface of the curved portion CV. Then, the brush 21 moves upward in a direction, which is opposite to the direction in which the third holding surface CS is disposed, to be ejected to the outside of the holding groove 12. For example, the brush 21 may reciprocate only in the vertical direction. Here, the inner side surface of the first flat portion FL1 of the glass product G and the inner side surface of the second flat portion FL2 may be pressed against the brush 21 and polished two times while the brush 21 reciprocates one time.

Referring to FIGS. 9 to 11, in some embodiments of the present disclosure, during the above-described operation of the brush 21, a slurry including a polishing material may be added to the holding groove 12. The polishing material may include at least one of urethane, polyurethane, cotton flannel, specialty fibers, non-woven fabric, cloth, sponge, wool, high-density plastic, cerium, silicon carbide, and cerium oxide.

In some embodiments of the present disclosure, after the above-described operation of the brush 21, a cleaning solution may be added to the holding groove 12. The cleaning solution may include a polishing solution for etching of the glass product G. For example, the polishing solution may include at least one of strong acid, strong alkali, and an oxidizer. As an example, the polishing solution may include at least one of hydrofluoric acid, sulfuric acid, nitric acid, hydrochloric acid, sodium hydroxide, and ammonium. As an example, the polishing solution may include a fluorinated compound including at least one of hydrofluoric acid, ammonium fluoride, ammonium bifluoride, tetrabutylammonium fluoride, tetrabutylammonium bifluoride, tetramethylammonium fluoride, tetraethylammonium fluoride, benzyltrimethylammonium fluoride, potassium fluoride, ammonium fluoroborate, potassium bifluoride, potassium tetrafluoroborate, sodium fluoride, sodium bifluoride, aluminum fluoride, fluoroboric acid, lithium fluoride, calcium fluoride, and copper fluoride. The polishing solution may further include a pH regulator. The pH regulator may include at least one of monoethanolamine, diethanolamine, triethanolamine, pentamethyldiethylenetriamine, tetramethylethylenediamine, ethylenediaminetetraacetic acid, diethylenetriaminepentaacetic acid, hydroxyethylenediamineacetic acid, glycol ether diamine tetraacetic acid, triethylenetetraaminehexaacetic acid, 1,3-propanediaminetetraacetic acid, 1,2-diamino-2-hydroxypropane tetraacetic acid, aminotrimethylenephosphonic acid, ethylenediaminetetramethylenephosphonic acid, diethylenetriaminepentamethylenephosphonic acid, and hexamethylenediaminetetramethylenephosphonic acid.

Figure 12:
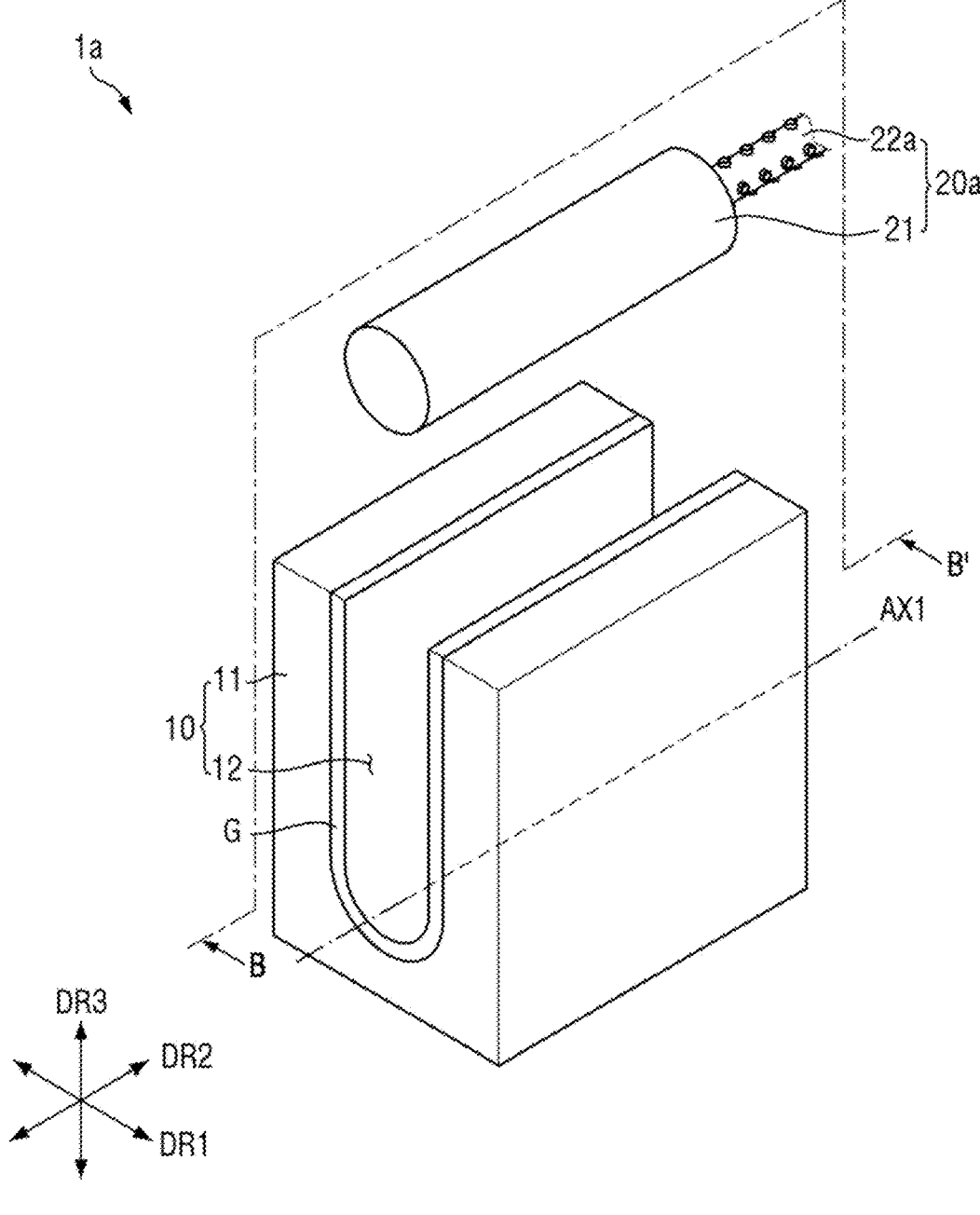
FIG. 12 is a perspective view illustrating a glass polishing apparatus according to an embodiment of the present disclosure.
Figure 13:
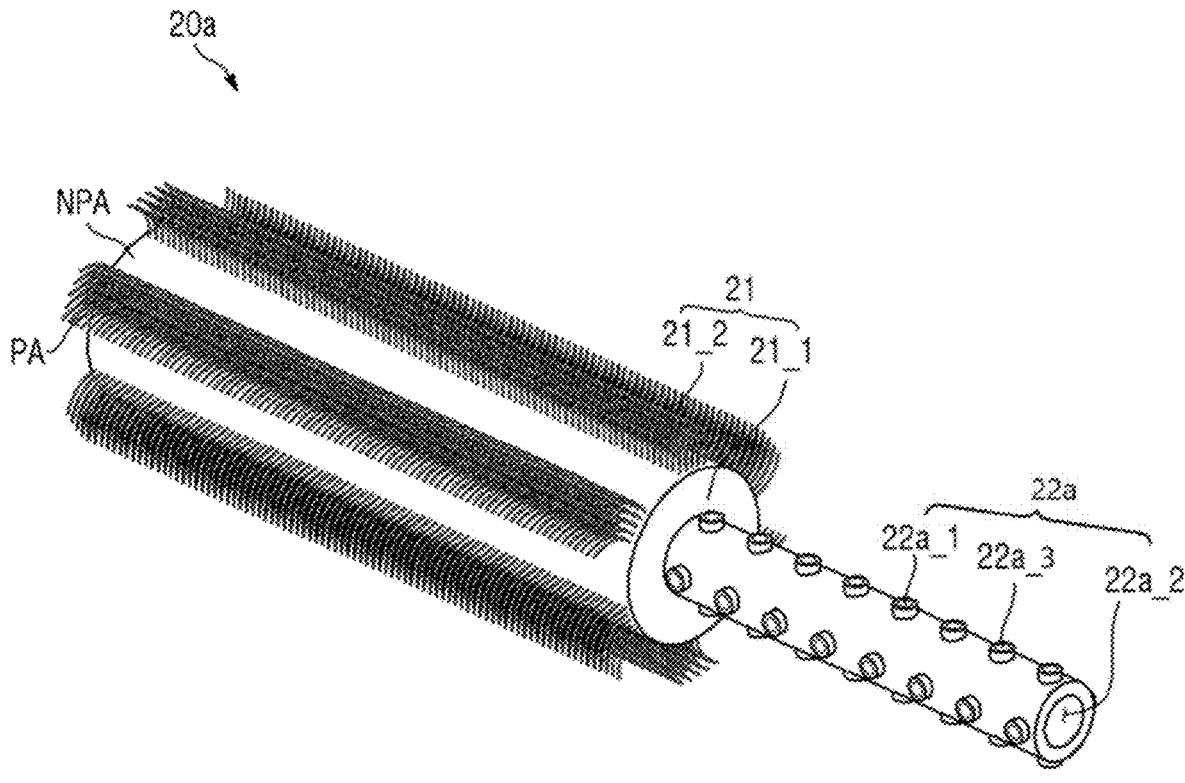
FIG. 13 is a perspective view illustrating a roller unit of FIG. 12.
Figure 14:
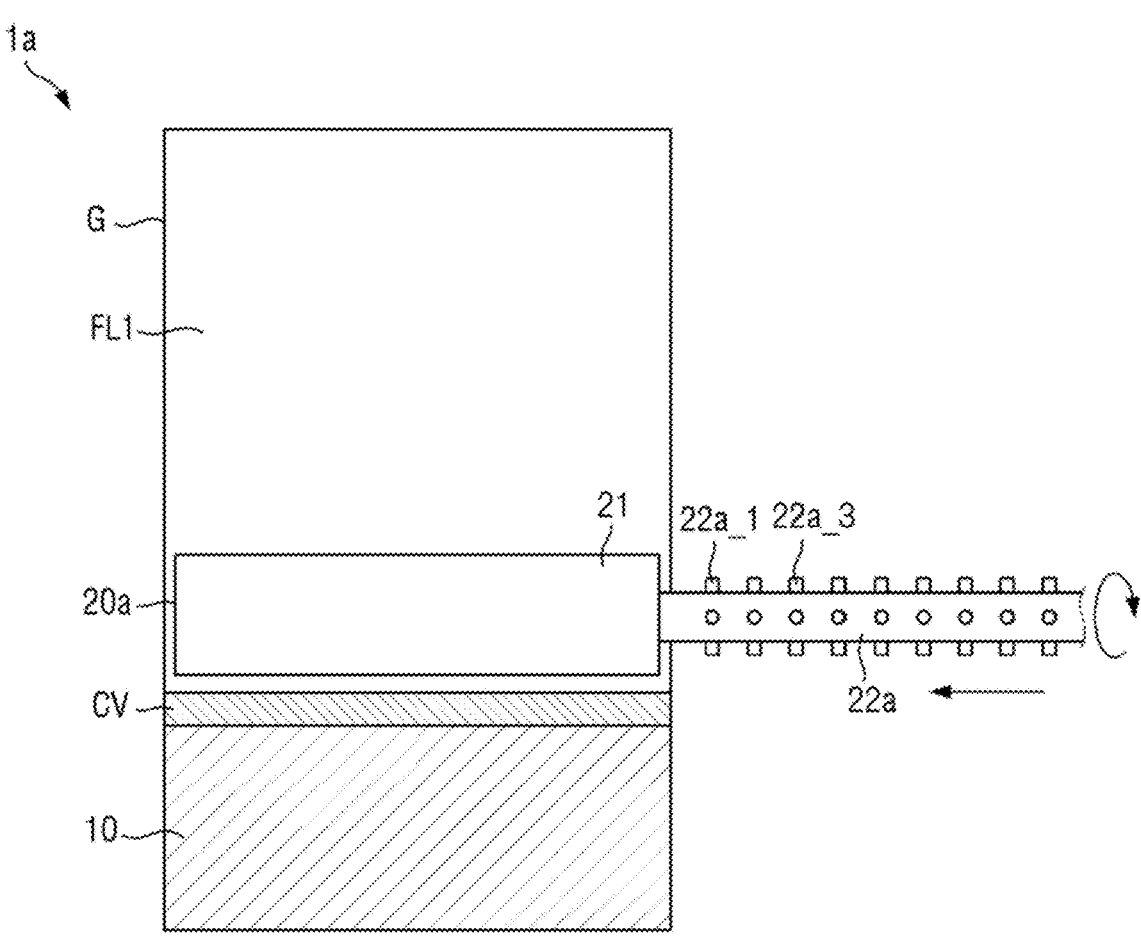
FIGS. 14 and 15 are cross-sectional views taken along line B-B' of FIG. 12.
Figure 14:
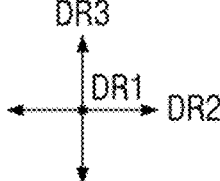
Figure 15:
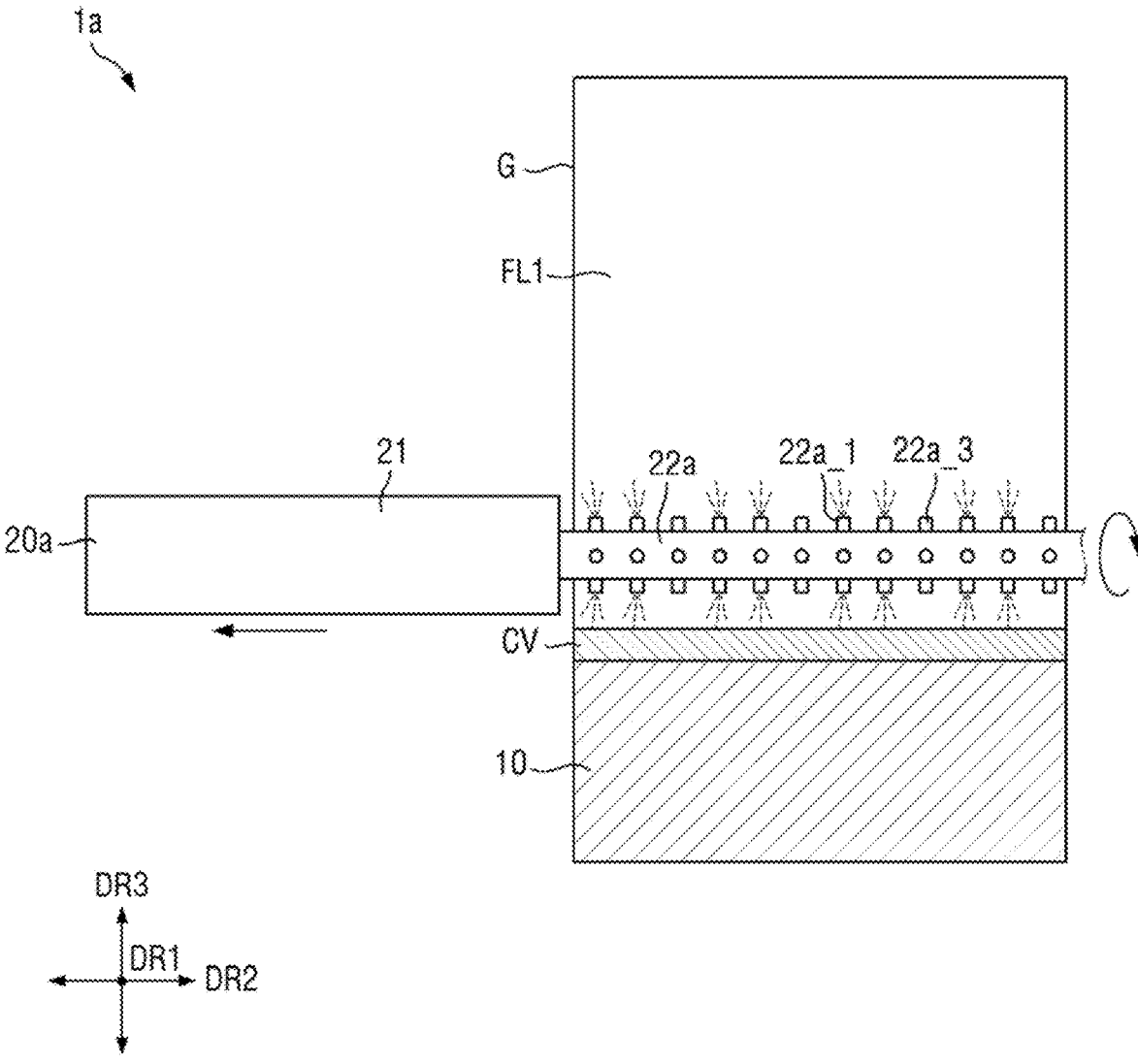

FIG. 12 is a perspective view illustrating a glass polishing apparatus according to an embodiment of the present disclosure. FIG. 13 is a perspective view illustrating a roller unit of FIG. 12. FIGS. 14 and 15 are cross-sectional views taken along line B-B' of FIG. 12.

The structure illustrated in FIG. 12 is different from the structure illustrated FIG. 6 in that a roller unit 20a further includes at least one of a spray nozzle 22a_1 and a suction nozzle 22a_3. Hereinafter, differences between the structure illustrated in FIG. 12 and the structure illustrated in FIG. 6 will be mainly described. It is to be understood that to the extent that a detailed description of one or more elements has been omitted, those elements may be at least similar to corresponding elements that are described elsewhere within the specification.

Referring to FIGS. 12 and 13, a glass polishing apparatus 1a may include a jig 10 and the roller unit 20a.

The roller unit 20a is movable in at least one direction.

The roller unit 20a may include a brush 21 and a rod 22a.

The brush 21 and the rod 22a are arranged in the second direction DR2. The brush 21 and the rod 22a may have the same central axis.

The brush 21 may include a cylinder 21_1 and a plurality of bristles 21_2.

As illustrated in FIG. 13, the plurality of bristles 21_2 may be disposed on an outer circumferential surface of the cylinder 21_1 so that the outer circumferential surface of the cylinder 21_1 is divided into a planting area PA and a non-planting area NPA, unlike in the embodiment of FIG. 8.

The planting area PA may be a region where the plurality of bristles 21_2 are disposed on the outer circumferential surface of the cylinder 21_1, and the non-planting area NPA may be a region where the plurality of bristles 21_2 are not disposed on the outer circumferential surface of the cylinder 21_1.

The planting area PA and the non-planting area NPA may be disposed in a stripe shape that extends in an axial direction of the cylinder 21_1 (e.g., the second direction DR2) on the outer circumferential surface of the cylinder 21_1. In one embodiment of the present disclosure, a plurality of planting areas PA and a plurality of non-planting areas NPA may surround the outer circumferential surface of the cylinder 21_1. In this case, the plurality of planting areas PA and the plurality of non-planting areas NPA may be alternately disposed in a rotational direction and/or circumferential direction of the cylinder 21_1. In this way, occurrence of scratches due to polishing may be minimized. In some embodiments of the present disclosure, the plurality of bristles 21_2 may include a polishing material. The polishing material may include at least one of a urethane-based material, a polyurethane-based material, cotton flannel, specialty fibers, non-woven fabric, cloth, sponge, wool, and high-density plastic. In some embodiments of the present disclosure, the polishing material may be separately supplied into the holding groove 12 during the polishing process.

The rod 22a may have a tubular shape including a hollow interior cavity 22a_2. At least one of the spray nozzle 22a_1 and suction nozzle 22a_3 may be disposed on an outer circumferential surface of the rod 22a. In some embodiments of the present disclosure, a plurality of spray nozzles 22a_1 and a plurality of suction nozzles 22a_3 may be alternately disposed to surround the outer circumferential surface of the rod 22a.

A cleaning solution may be sprayed through the spray nozzle 22a_1. The cleaning solution may include a polishing solution for etching of the glass product G. The composition of the polishing solution has been described above with reference to FIGS. 9 to 11. The glass polishing apparatus 1a may further include a cleaning solution supplier configured to supply the cleaning solution to the hollow interior cavity 22a_2 of the rod 22a. In some embodiments of the present disclosure, the cleaning solution may be sprayed by a centrifugal force due to rotation of the roller unit 20a.

The sprayed cleaning solution may be suctioned through the suction nozzle 22a_3. For example, after the cleaning solution is sprayed through the spray nozzle 22a_1, a negative pressure may be formed in the hollow interior cavity 22a_2 of the rod 22a and the sprayed cleaning solution may be suctioned back. For example, the hollow interior cavity 22a_2 of the rod 22a may communicate with the spray nozzle 22a_1 and the suction nozzle 22a_3 and serve as a flow path that supplies or suctions the cleaning solution. In FIG. 13, the supply and suction of the cleaning solution are performed through the single hollow interior cavity 22a_2, but the present disclosure is not necessarily limited thereto. In some embodiments of the present disclosure, the hollow interior cavity 22a_2 of the rod 22a may be formed as a plurality of hollow interior cavities 22a_2 and provide separate flow paths for the supply and suction of the cleaning solution. In this case, the supply of the cleaning solution may be performed through a hollow interior cavity 22a_2 that communicates with the spray nozzle 22a_1 among the plurality of hollow interior cavities 22a_2, and the suction of the cleaning solution may be performed through a hollow interior cavity 22a_2 that communicates with the suction nozzle 22a_3 among the plurality of hollow interior cavities 22a_2.

Referring to FIGS. 14 and 15, the roller unit 20a might not only move in the first direction DR1 and/or third direction DR3 as in the embodiment of FIGS. 9 to 11, but may also move forward and backward in the second direction DR2. Accordingly, the brush 21 and the rod 22a may be selectively inserted into the holding groove 12.

First, as illustrated in FIG. 14, the roller unit 20a disposed outside the holding groove 12 may move to be disposed on the third holding surface CS. For example, as illustrated in FIG. 14, the roller unit 20a may move in the second direction DR2, e.g., in a leftward direction in FIG. 14, and be inserted into the holding groove 12. Alternatively, the roller unit 20a may move downward from the upper side of the holding groove 12 toward the third holding surface CS in the third direction DR3 and be inserted into the holding groove 12 as illustrated in FIGS. 9 to 11. In this case, at least one of the first flat portion FL1 and the second flat portion FL2 of the glass product G may be polished by the roller unit 20a.

In a case in which the roller unit 20a is disposed on the third holding surface CS, the brush 21 may rotate so that the concave inner side surface of the glass product G on the third holding surface CS is mechanically polished.

As illustrated in FIG. 15, after polishing by the brush 21 is completed, in a state in which the roller unit 20a is still at a position reached by moving downward, the roller unit 20a may move forward in the second direction DR2, e.g., in a leftward direction of FIG. 15, so that the rod 22a is disposed in the holding groove 12. Accordingly, as illustrated in FIG. 15, the brush 21 is ejected from the holding groove 12 and exposed to the outside, and the rod 22a is disposed in the holding groove 12. Then, the cleaning solution may be sprayed through the spray nozzle 22a_1 so that the glass product G is cleaned and/or etched. When spraying of the cleaning solution is completed, the remaining cleaning solution may be suctioned back through the suction nozzle 22a_3. In some embodiments of the present disclosure, the spraying and suctioning of the cleaning solution may be simultaneously performed. After the cleaning and/or etching of the glass product G is completed, the roller unit 20a may move back upward and be ejected to the outside of the holding groove 12.

Since the embodiment of FIG. 12 is substantially the same as or similar to the embodiment of FIG. 6 except for the roller unit 20a, repeated description will be omitted. It is to be understood that to the extent that a detailed description of one or more elements has been omitted, those elements may be at least similar to corresponding elements that are described elsewhere within the specification.

Figure 16:
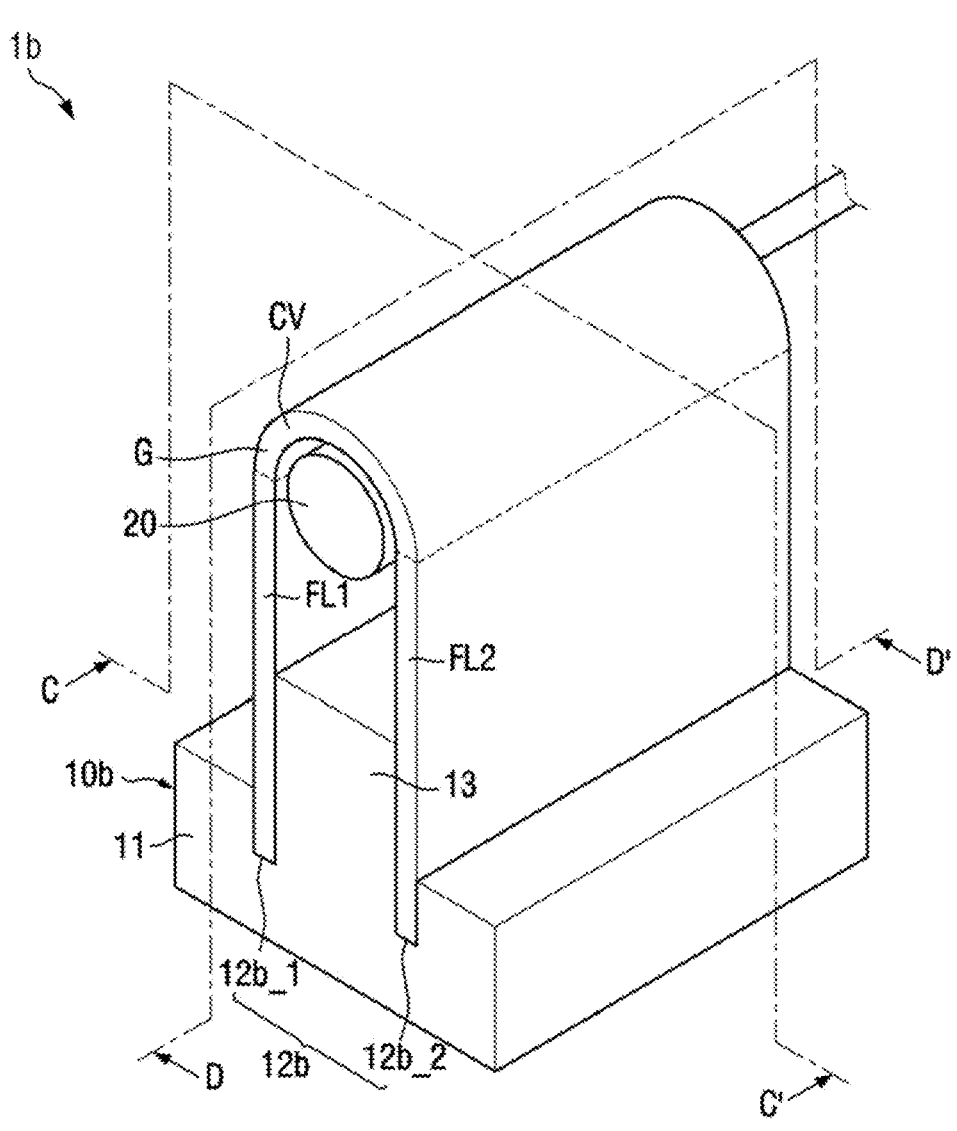
FIG. 16 is a perspective view illustrating a glass polishing apparatus according to an embodiment of the present disclosure.
Figure 16:
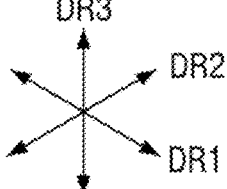
Figure 17:
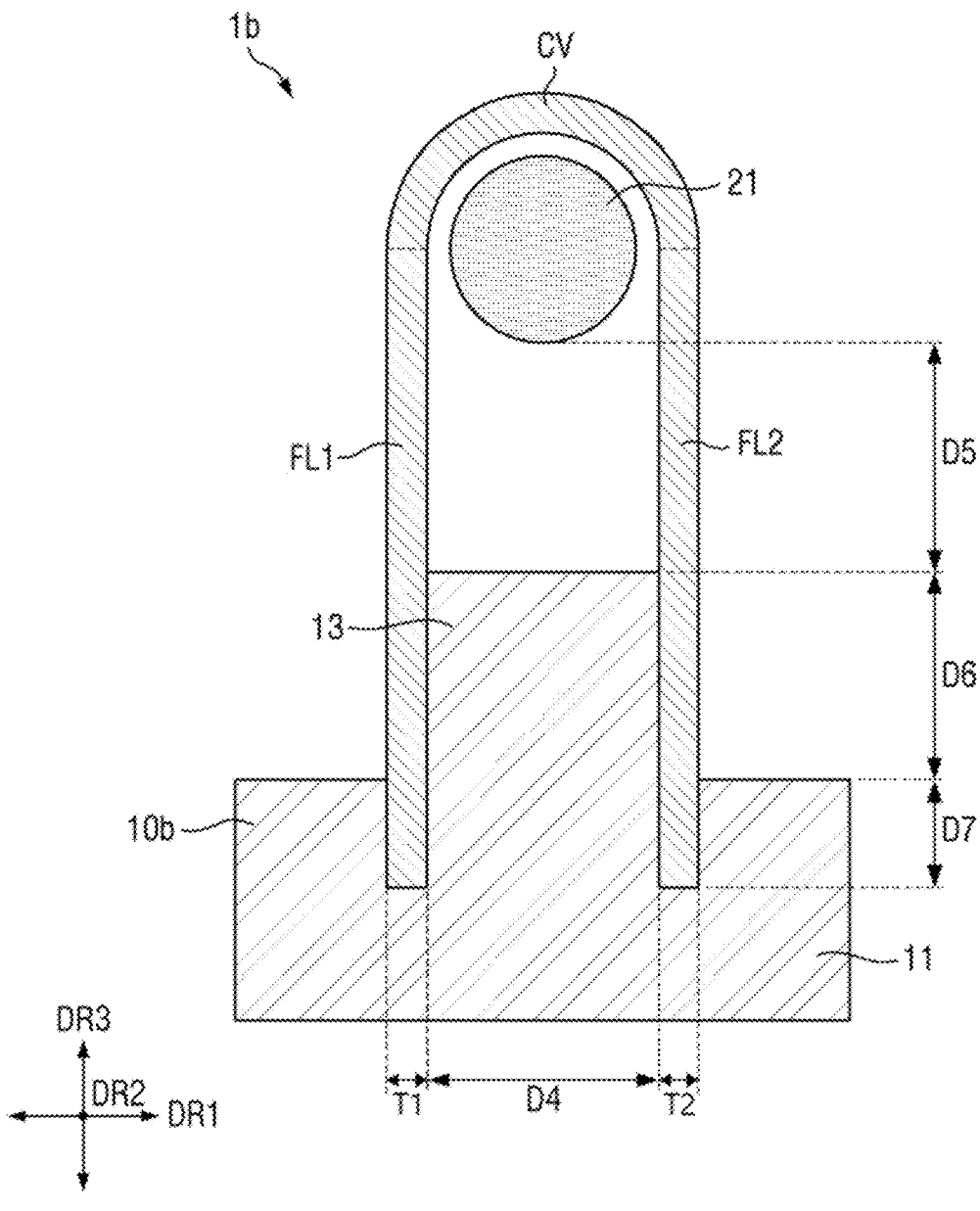
FIG. 17 is a cross-sectional view taken along line C-C' of FIG. 16.
Figure 18:
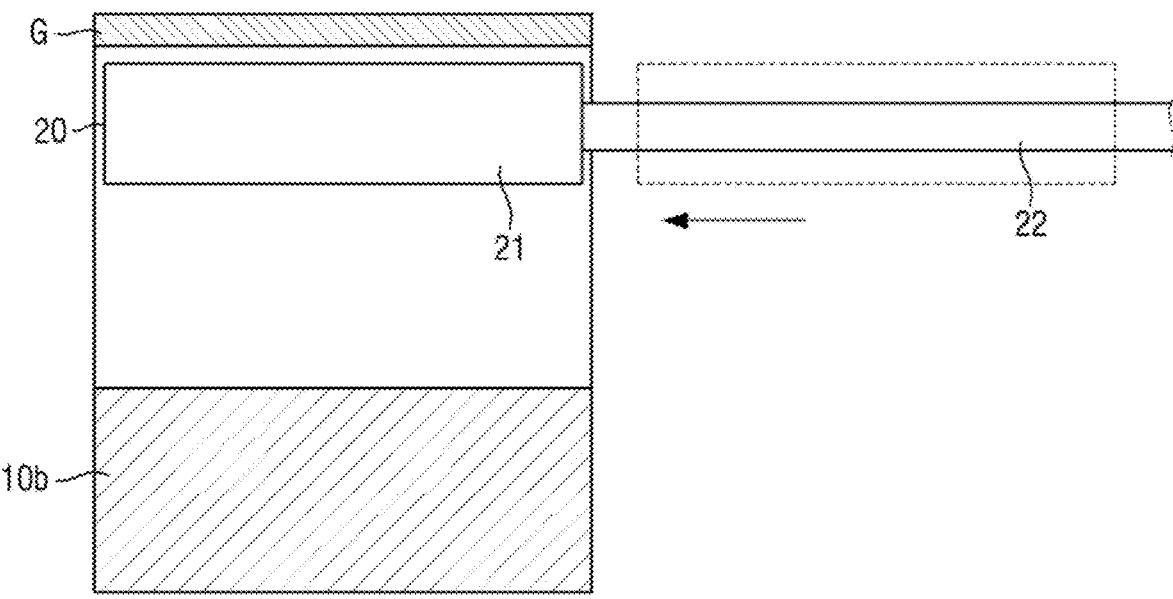
FIG. 18 is a cross-sectional view taken along line D-D' of FIG. 16.

FIG. 16 is a perspective view illustrating a glass polishing apparatus according to an embodiment of the present disclosure. FIG. 17 is a cross-sectional view taken along line C-C' of FIG. 16. FIG. 18 is a cross-sectional view taken along line D-D' of FIG. 16.

The structure illustrated in FIG. 16 is different from the structure illustrated in FIG. 6 in that a jig 10b supports the inner side surface of the glass product G. Hereinafter, differences between the embodiment of FIG. 16 and the embodiment of FIG. 6 will be mainly described. It is to be understood that to the extent that a detailed description of one or more elements has been omitted, those elements may be at least similar to corresponding elements that are described elsewhere within the specification.

Referring to FIGS. 16 to 18, a glass polishing apparatus 1b may include the jig 10b and a roller unit 20.

The jig 10b holds an object to be polished. The object to be polished may include the glass product G of FIG. 1. In one embodiment of the present disclosure, the jig 10b may have a rectangular-parallelepiped shape as a whole, but the shape of the jig 10b is not necessarily limited thereto.

The jig 10b may include a first holding groove 12b_1 into which a portion of the first flat portion FL1 of the glass product G is inserted and a second holding groove 12b_2 into which a portion of the second flat portion FL2 is inserted. The jig 10b may further include a protruding portion 13 disposed between the first holding groove 12b_1 and the second holding groove 12b_2.

The first holding groove 12b_1 and the second holding groove 12b_2 are recessed downward from one surface of the jig 10b. In one embodiment of the present disclosure, the one surface may be an upper surface. The first holding groove 12b_1 and the second holding groove 12b_2 extend in the second direction DR2. The first holding groove 12b_1 and the second holding groove 12b_2 may each have a predetermined width in the first direction DR1. The width of the first holding groove 12b_1 and the width of the second holding groove 12b_2 may be the same as the thickness T1 of the first flat portion FL1 of the glass product G and the thickness T2 of the second flat portion FL2, respectively. The first holding groove 12b_1 and the second holding groove 12b_2 may each have a predetermined depth D7 in the third direction DR3. For example, the predetermined depth D7 may be less than or equal to ¼ of the length of the first flat portion FL1 and/or second flat portion FL2 in the third direction DR3. The first holding groove 12b_1 and the second holding groove 12b_2 may be disposed at a predetermined gap D4 in the first direction DR1. The predetermined gap D4 may be the gap D4 between the first flat portion FL1 and the second flat portion FL2 of the glass product G in the first direction DR1. In one embodiment of the present disclosure, one side of each of the first holding groove 12b_1 and the second holding groove 12b_2 in the second direction DR2 and the other side of each of the first holding groove 12b_1 and the second holding groove 12b_2 in the direction opposite to the second direction DR2 may be open. An end portion of the first flat portion FL1 of the glass product G and an end portion of the second flat portion FL2 may be inserted into the first holding groove 12b_1 and the second holding groove 12b_2, respectively. In some embodiments of the present disclosure, the first holding groove 12b_1 and the second holding groove 12b_2 may include at least one hole H configured to adsorb the glass product G.

The protruding portion 13 protrudes upward between the first holding groove 12b_1 and the second holding groove 12b_2. For example, the protruding portion 13 may protrude to a predetermined height D6 from the upper surface of the jig 10b that is adjacent to the first holding groove 12b_1 and the second holding groove 12b_2. The predetermined height D6 may be larger than or equal to the predetermined depth D7 of the first holding groove 12b_1 and/or the second holding groove 12b_2. For example, the predetermined height D6 may be larger than or equal to two times the depth D7 of the first holding groove 12b_1 and/or the second holding groove 12b_2. As an example, the predetermined height D6 may be larger than or equal to half of the length of the first flat portion FL1 and/or the second flat portion FL2 in the third direction DR3. The protruding portion 13 is inserted between the first flat portion FL1 and the second flat portion FL2 of the glass product G.

The protruding portion 13 may include one or more holding surfaces. The holding surfaces may be one side surface and the other side surface of the protruding portion 13. The one side surface and the other side surface of the protruding portion 13 may be pressed against the inner side surface of the first flat portion FL1 and the inner side surface of the second flat portion FL2, respectively. As illustrated in FIGS. 16 and 17, a left side surface of the protruding portion 13 may be pressed against the inner side surface of the first flat portion FL1, and a right side surface of the protruding portion 13 may be pressed against the inner side surface of the second flat portion FL2. For example, the width of the protruding portion 13 in the first direction DR1 may be the same as the gap between the first flat portion FL1 and the second flat portion FL2 in the first direction DR1. The width of the protruding portion 13 in the first direction DR1 may be larger than or equal to the diameter DB1 of the brush 21 (e.g., the width of the brush 21 in the first direction DR1. The protruding portion 13 may be spaced apart from the brush 21 at a predetermined gap D5 in the third direction DR3. The predetermined gap D5 may be larger than or equal to the height D6 of the protruding portion 13.

The one side surface and the other side surface of the protruding portion 13 may have shapes that correspond to the inner side surface of the first flat portion FL1 and the inner side surface of the second flat portion FL2, respectively. In one embodiment of the present disclosure, the one side surface and the other side surface of the protruding portion 13 may extend in a straight line in the third direction DR3. The one side surface and the other side surface of the protruding portion 13 may be parallel to each other or inclined with respect to each other. In some embodiments of the present disclosure, similarly to FIG. 7, the one side surface and the other side surface of the protruding portion 13 may each include at least one hole for adsorbing and fixing the glass product G. In some embodiments of the present disclosure, the first holding groove 12b_1 and the second holding groove 12b_2 may be omitted, and the glass product G may be adsorbed and fixed by the one side surface and the other side surface of the protruding portion 13 that have the hole formed therein.

Referring to FIG. 18, after the glass product G is held in the jig 10b, the brush 21 may move in the second direction DR2 and be inserted between the glass product G and the protruding portion 13. For example, in FIG. 18, the brush 21 may move forward in the leftward direction and be inserted between an upper surface of the protruding portion 13 and the inner side surface of the curved portion CV of the glass product G. Then, the brush 21 may rotate with respect to the rod 22, which extends in the second direction DR2, to polish the concave inner side surface of the curved portion CV of the glass product G. After polishing is completed, the brush 21 may move backward in the rightward direction and be ejected to the outside of the glass product G. In this case, only the inner side surface of the curved portion CV of the glass product G may be polished. In some embodiments of the present disclosure, the brush 21 may be inserted between the glass product G and the protruding portion 13 and then move in the third direction DR3 to additionally polish the inner side surface of the first flat portion FL1 of the glass product G and the inner side surface of the second flat portion FL2. For example, according to driving of the brush 21, at least one of the first flat portion FL1, the second flat portion FL2, and the curved portion CV of the glass product G may be selectively polished.

Figure 19:
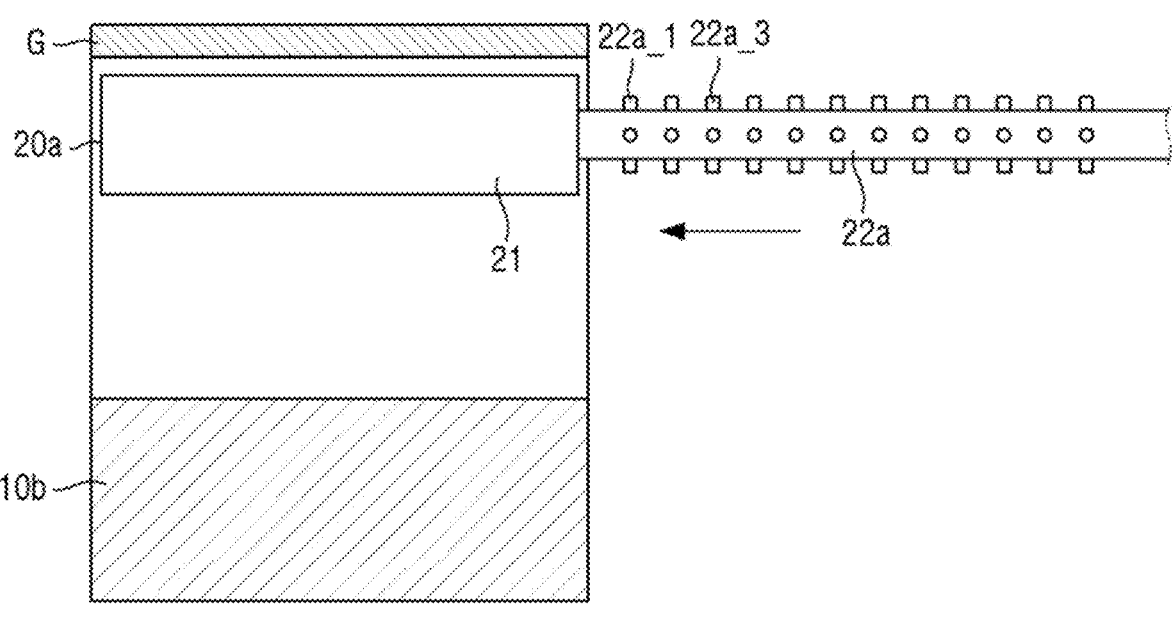
FIGS. 19 and 20 are cross-sectional views illustrating a glass polishing apparatus according to an embodiment of the present disclosure.
Figure 19:
Figure 19:
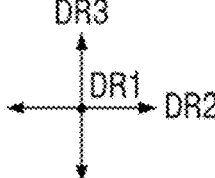
Figure 20:
Figure 20:
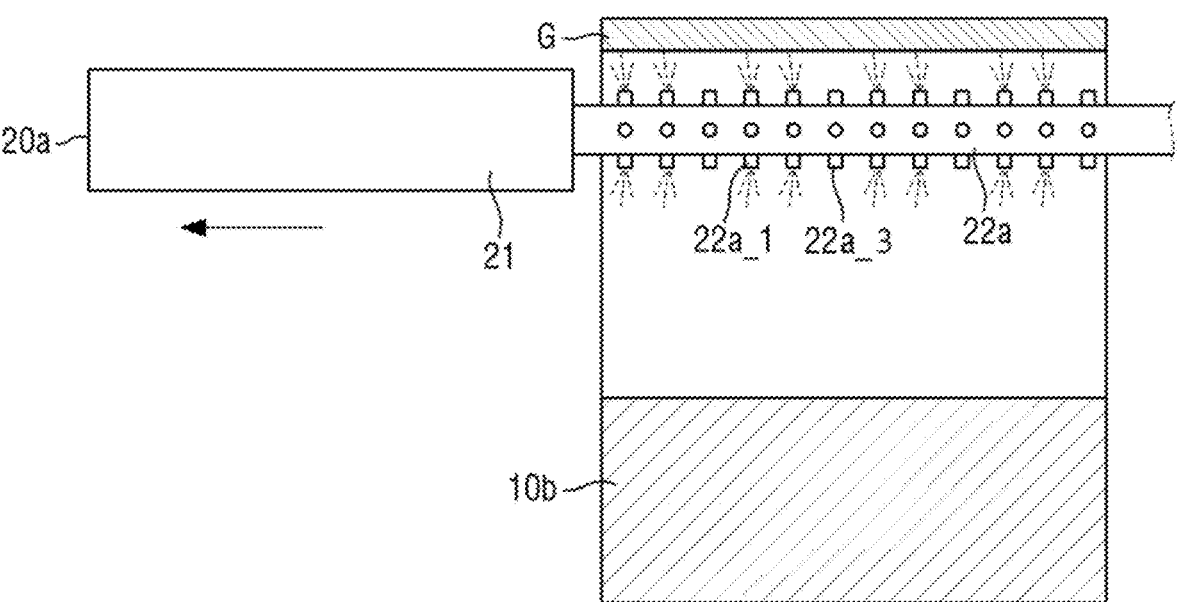
Figure 20:
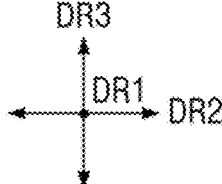

FIGS. 19 and 20 are cross-sectional views of a glass polishing apparatus according to an embodiment of the present disclosure.

The structure illustrated in FIG. 19 is different from the structure illustrated FIG. 16 in that a roller unit 20a further includes at least one of a spray nozzle 22a_1 and/or a suction nozzle 22a_3. Hereinafter, differences between the embodiment of FIG. 19 and the embodiment of FIG. 16 will be mainly described. It is to be understood that to the extent that a detailed description of one or more elements has been omitted, those elements may be at least similar to corresponding elements that are described elsewhere within the specification.

Referring to FIGS. 19 and 20, a glass polishing apparatus 1c may include a jig 10b and a roller unit 20a.

The roller unit 20a may include a brush 21 and a rod 22a. The rod 22a may have a hollow interior cavity 22a_2 formed therein and include at least one of the spray nozzle 22a_1 and the suction nozzle 22a_3.

Since the configuration of the roller unit 20a is substantially the same as or similar to that in the embodiment of FIG. 12, hereinafter, operation of the roller unit 20a will be mainly described. It is to be understood that to the extent that a detailed description of one or more elements has been omitted, those elements may be at least similar to corresponding elements that are described elsewhere within the specification.

As illustrated in FIGS. 19 and 20, the roller unit 20a may move in the second direction DR2 to allow the brush 21 and the rod 22a to be selectively inserted between the glass product G and the jig 10b.

First, referring to FIG. 19, the roller unit 20a may move in the leftward direction to allow the brush 21 to be disposed between the glass product G and the jig 10b. Then, the brush 21 may rotate clockwise or counterclockwise with respect to an axis of rotation, which extends in the second direction DR2, to mechanically polish the inner side surface of the curved portion CV of the glass product G.

Then, referring to FIG. 20, after polishing by the brush 21 is completed, the roller unit 20a may move further in the leftward direction to allow the rod 22a to be disposed between the glass product G and the jig 10b. Then, the cleaning solution may be sprayed from the spray nozzle 22a_1 of the rod 22a to clean and/or etch the inner side surface of the curved portion CV of the glass product G. After the cleaning solution is sprayed, the remaining cleaning solution may be suctioned through the suction nozzle 22a_3 of the rod 22a. In some embodiments of the present disclosure, the spraying and suctioning of the cleaning solution may be simultaneously performed.

Since the embodiment of FIG. 19 is substantially the same as or similar to the embodiment of FIG. 16 except for the roller unit 20a, repeated description will be omitted. It is to be understood that to the extent that a detailed description of one or more elements has been omitted, those elements may be at least similar to corresponding elements that are described elsewhere within the specification.

Figure 21:
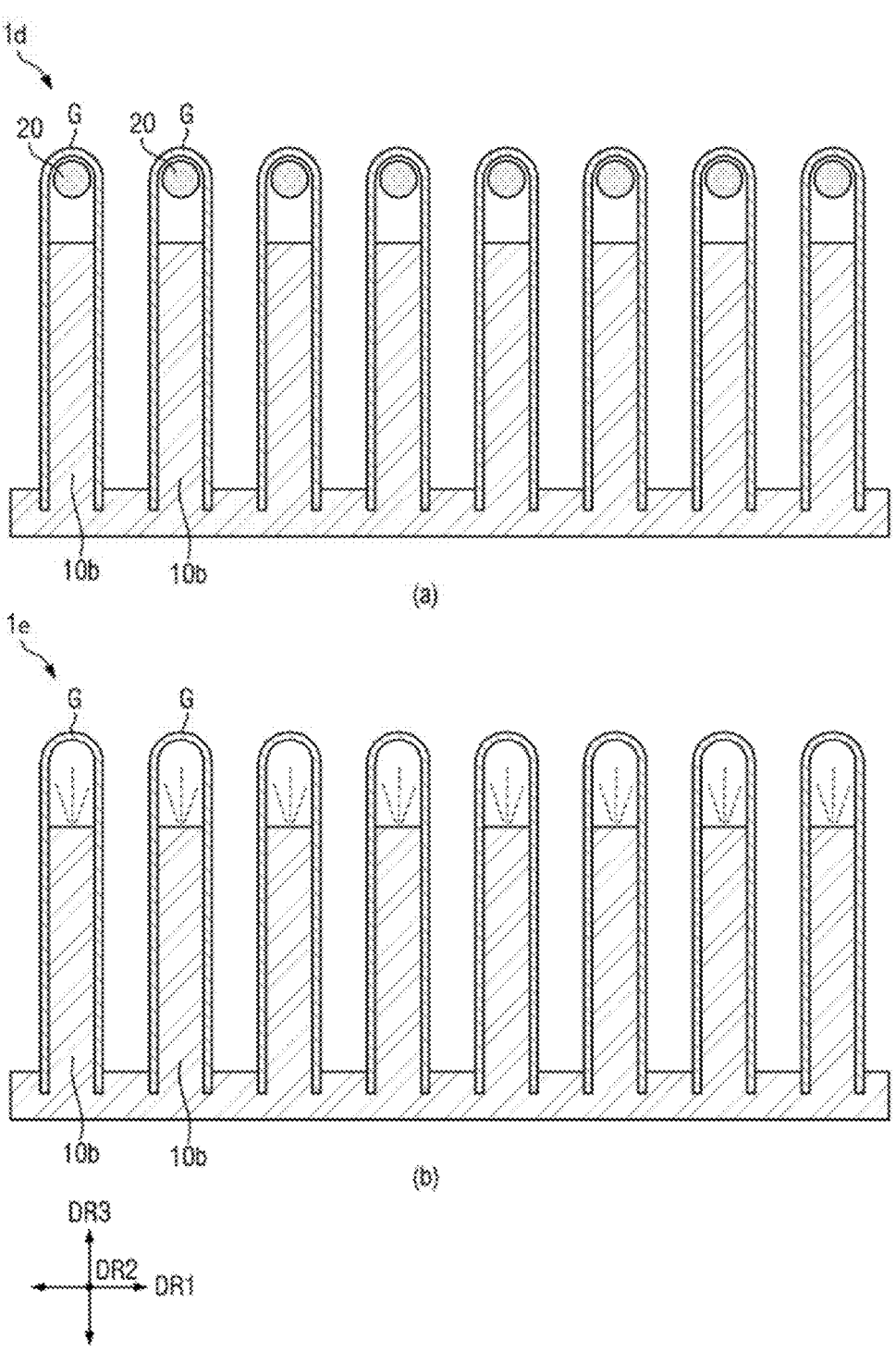
FIG. 21 is a conceptual arrangement diagram illustrating a glass polishing apparatus according to an embodiment of the present disclosure.

FIG. 21 is a conceptual arrangement diagram of a glass polishing apparatus according to an embodiment of the present disclosure.

Element (a) of FIG. 21 is a view illustrating polishing a plurality of glass products. Element (b) of FIG. 21 is a view illustrating cleaning and/or etching the plurality of glass products.

Referring to FIGS. 16 and 21, the jig 10b and the roller unit 20 of FIG. 16 may be provided as a plurality of jigs 10b and a plurality of roller units 20. For example, the jig 10b and the roller unit 20 may constitute a single module, and the module may be provided as a plurality of modules to polish and clean a plurality of glass products G.

The plurality of jigs 10b may be arranged in the first direction DR1. The first direction DR1 may be a direction perpendicular to a direction in which the first holding groove 12b_1 and the second holding groove 12b_2 extend and/or a direction perpendicular to a direction in which the roller unit 20 is inserted. The plurality of jigs 10b may be integrally formed as a single structure. Likewise, the plurality of roller units 20 may also be integrally formed as a single structure. FIG. 21 illustrates the case in which the jig 10b of FIG. 16 is provided as the plurality of jigs 10b, but the jig 10 of FIG. 6 may also be provided as a plurality of jigs 10 using a similar method.

Referring to element (b) of FIG. 21, unlike in the structure illustrated in FIG. 12 or FIG. 19, the cleaning solution may be sprayed from an upper portion of the jig 10b. For example, a spray nozzle configured to spray a cleaning solution and/or a suction nozzle configured to suction the sprayed cleaning solution may be disposed at the upper surface of the protruding portion 13 of the jig 10b.

Since the structure illustrated in FIG. 21 is substantially the same as or similar to what is shown in FIG. 16 except for the arrangement of the jigs 10b and the roller units 20, repeated description will be omitted. It is to be understood that to the extent that a detailed description of one or more elements has been omitted, those elements may be at least similar to corresponding elements that are described elsewhere within the specification.

Figure 22:
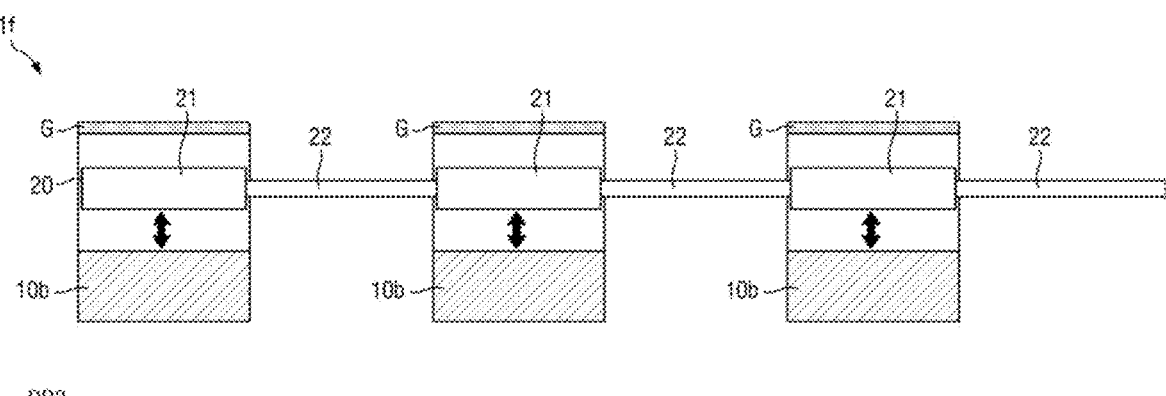
FIG. 22 is a conceptual arrangement diagram illustrating a glass polishing apparatus according to an embodiment of the present disclosure.
Figure 22:
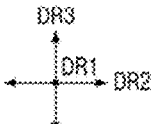

FIG. 22 is a conceptual arrangement diagram of a glass polishing apparatus according to an embodiment of the present disclosure.

Referring to FIGS. 16 and 22, the plurality of jigs 10b of FIG. 16 may be arranged in the second direction DR2. The second direction DR2 may be the direction perpendicular to the direction in which the first holding groove 12b_1 and the second holding groove 12b_2 extend and/or the direction in which the roller unit 20 is inserted. In this case, a plurality of inner spaces formed by the plurality of jigs 10b and the plurality of glass products G held therein may be aligned in the second direction DR2, and the roller unit 20 formed in the shape of a long bar extending in the second direction DR2 may pass through the plurality of inner spaces.

The roller unit 20 may include a plurality of brushes 21. The plurality of brushes 21 may be disposed at predetermined intervals on the rod 22. The plurality of brushes 21 may be disposed at each of the plurality of jigs 10b. For example, the plurality of brushes 21 may be disposed at intervals equal to those of the plurality of jigs 10b.

Referring further to FIG. 18, the plurality of brushes 21 may move in at least one direction to simultaneously polish the inner side surfaces of the plurality of glass products G. The at least one direction may include the first direction DR1, the second direction DR2, and the third direction DR3. The at least one direction may include a diagonal direction including two or more of the first direction DR1, second direction DR2, and third direction DR3. For example, the plurality of brushes 21 may move forward and backward in the second direction DR2 so that each brush 21 is disposed between each jig 10*b* and each glass product G. Then, the plurality of brushes 21 may rotate with respect to the rod 22 to polish the curved portion CV of each of the plurality of glass products G. As an example, similar to FIGS. 9 to 11, the brush 21 may move in the first direction DR1 and the second direction DR3 to additionally polish the inner side surface of the first flat portion FL1 of the glass product G and the inner side surface of the second flat portion FL2.

Figure 23:
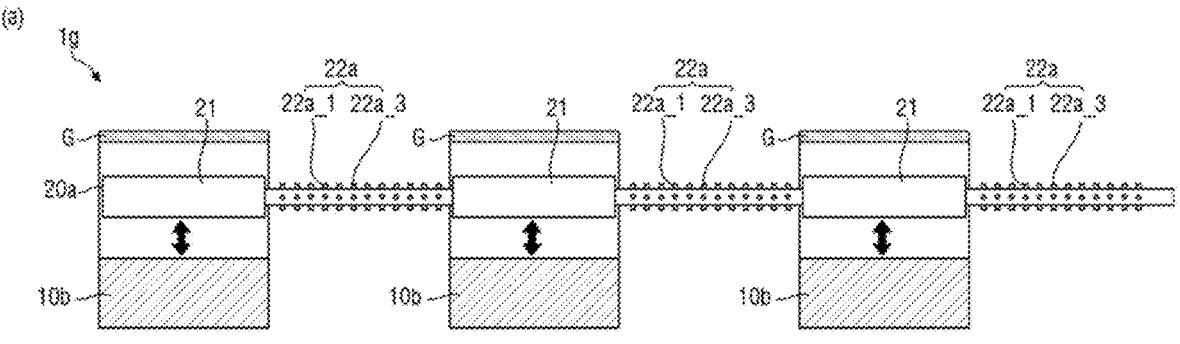
FIG. 23 is a conceptual arrangement diagram illustrating a glass polishing apparatus according to an embodiment of the present disclosure.
Figure 23:
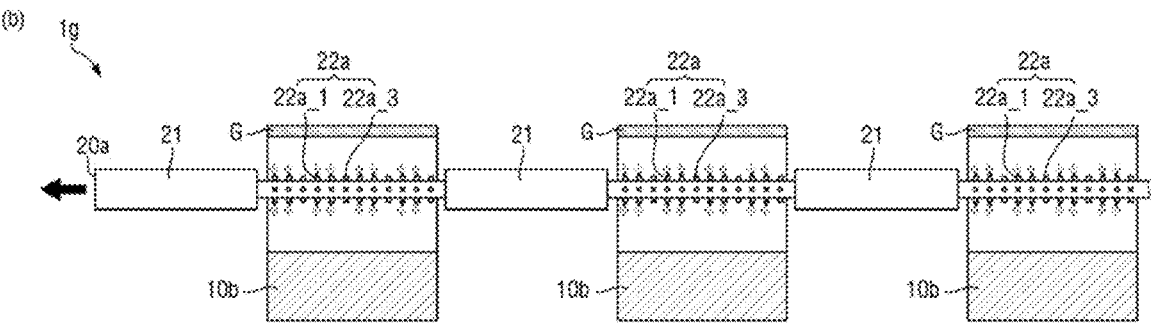
Figure 23:

FIG. 23 is a conceptual arrangement diagram of a glass polishing apparatus according to an embodiment of the present disclosure.

Element (a) of FIG. 23 illustrates polishing a plurality of glass products. Element (b) of FIG. 23 illustrates cleaning and/or etching the plurality of glass products.

The structure illustrated in FIG. 23 is similar to the structure illustrated in FIG. 22 in that a plurality of jigs are arranged in the second direction but is different from the structure illustrated in FIG. 22 in that the spray nozzle 22*a*_1 and the suction nozzle 22*a*_3 are disposed between a plurality of brushes.

Referring to FIGS. 13 and 23, a roller unit 20*a* may include a plurality of brushes 21 and a rod 22*a*.

The plurality of brushes 21 may be arranged at predetermined intervals on the rod 22*a* in the second direction DR2. The rod 22*a* may have a hollow interior cavity 22*a*_2 formed therein and include at least one of the spray nozzle 22*a*_1 and the suction nozzle 22*a*_3. The spray nozzle 22*a*_1 and the suction nozzle 22*a*_3 may be disposed between the plurality of brushes 21.

The roller unit 20*a* may move in the second direction DR2 to allow the plurality of brushes 21, the spray nozzle 22*a*_1, and the suction nozzle 22*a*_3 to be selectively inserted between the glass product G and the jig 10*b*.

Referring to element (a) of FIG. 23, the roller unit 20*a* may move in the second direction DR2 so that each brush 21 of the plurality of brushes 21 is disposed between the glass product G and the jig 10*b*. Then, the plurality of brushes 21 may rotate with respect to the rod 22*a* to simultaneously polish the inner side surfaces of the plurality of glass products G. The plurality of brushes 21 may polish only the curved portion CV of the glass product G or additionally move in the first direction DR1 and the third direction DR3 to additionally polish the first flat portion FL1 and the second flat portion FL2.

Referring to element (b) of FIG. 23, after polishing of the glass product G is completed, the roller unit 20*a* may move further in the second direction DR2 so that the spray nozzle 22*a*_1 and the suction nozzle 22*a*_3 are disposed between the glass product G and the jig 10*b*. Then, the cleaning solution may be sprayed from the spray nozzle 22*a*_1 to simultaneously clean and/or etch the inner side surfaces of the plurality of glass products G. After or while the cleaning solution is sprayed, the suction nozzle may suction the cleaning solution sprayed onto the plurality of glass products G.

Figure 24:
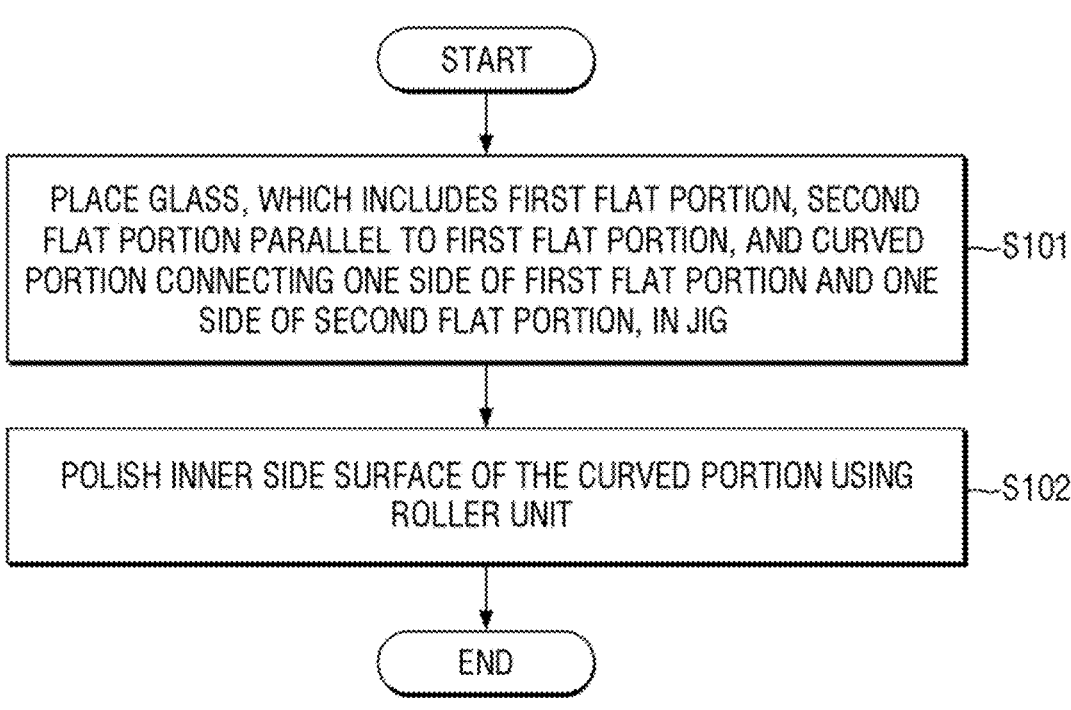
FIG. 24 is a flowchart illustrating a glass polishing method according to an embodiment of the present disclosure.

For example, the plurality of glass products G may be simultaneously polished and cleaned using a similar method to the embodiment of FIGS. 14 and 15. FIG. 24 is a flowchart of a glass polishing method according to an embodiment of the present disclosure.

The following glass polishing method may be performed using the glass polishing apparatuses 1, 1*a*, 1*b*, and 1*c* of FIGS. 6 to 23.

Referring to FIG. 24, the glass polishing method may include placing glass, which includes a first flat portion FL1, a second flat portion FL2 opposite to the first flat portion FL1, and a curved portion CV that connects one side of the first flat portion FL1 and one side of the second flat portion FL2, in a jig 10 and moving a roller unit 20 between the first flat portion FL1 and the second flat portion FL2 to polish one concave side of the curved portion CV.

The glass polishing method may include cleaning the curved portion CV and etching the curved portion CV. The cleaning and etching of the curved portion CV may be sequentially performed or simultaneously performed.

Referring further to FIGS. 7 and 16, the polishing of the one concave side of the curved portion CV may include placing a brush 21 between the first flat portion FL1 and the second flat portion FL2.

Referring further to FIGS. 15 and 20, the cleaning of the curved portion CV and/or the etching of the curved portion CV may include moving the roller unit 20 further in one direction so that a rod 22 connected to one side of the brush 21 is disposed between the first flat portion FL1 and the second flat portion FL2.

Referring further to FIG. 6, the placing of the glass in the jig 10 may include placing the first flat portion FL1 of the glass on a first holding surface FS1, placing the second flat portion FL2 on a second holding surface FS2, which is opposite to the first holding surface FS1, and placing the curved portion CV on a third holding surface CS that connects the first holding surface FS1 and the second holding surface FS2.

Referring to FIGS. 9 to 11, the polishing of the one concave side of the curved portion CV may include inserting the roller unit 20 into a holding groove 12 of the jig 10 and moving the inserted roller unit 20 along the shapes of the first holding surface FS1, the second holding surface FS2, and the third holding surface CS.

Referring to FIG. 12, the placing of the glass in the jig 10 may include inserting one end of the first flat portion FL1 of the glass into a first holding groove 12*b*_1 of the jig 10 and inserting one end of the second flat portion FL2 into a second holding groove 12*b*_2.

Referring to FIGS. 18 and 19, the polishing of the one concave side of the curved portion CV may include placing the roller unit 20 between a protruding portion 13 of the jig 10 and the glass.

At least some of the steps of the glass polishing method may be omitted, or the glass polishing method may further include at least one other step with reference to FIGS. 6 to 23.

According to a glass polishing apparatus and a glass polishing method using the same according to various embodiments of the present disclosure, a curved portion of a glass product can be polished.

The present invention is not necessarily limited to the embodiments of the present disclosure mentioned above, and various other aspects and effects are incorporated herein.

Those skilled in the art will appreciate that many variations and modifications can be made to the embodiments of the present disclosure described herein without substantially departing from the principles of the present disclosure.

What is claimed is:

1. A glass polishing apparatus, comprising:

a jig holding a glass structure, the glass structure including a first flat portion, a second flat portion opposite to the first flat portion, and a curved portion connecting the first flat portion to the second flat portion, wherein the jig includes a first holding groove, recessed with respect to a top surface of the jig, receiving the first flat portion of the glass structure by the insertion of the first flat portion of the glass structure into the recess of the first holding groove, and a second holding groove, recessed with respect to the top surface of the jig, receiving the second flat portion of the glass structure by the insertion of the second flat portion of the glass structure into the recess of the second holding groove; and a roller unit having a cylindrical shape, wherein at least a portion of the roller unit is disposed between the first flat portion of the glass structure and the second flat portion of the glass structure and between the curved portion of the glass structure and the top surface of the jig.

2. The glass polishing apparatus of claim 1, wherein the jig further includes a protruding portion that is disposed between the first holding groove and the second holding groove and is disposed between the first flat portion of the glass structure and the second flat portion of the glass structure.

3. The glass polishing apparatus of claim 2, wherein a first side of the protruding portion contacts the first flat portion of the glass structure, and a second side of the protruding portion contacts the second flat portion of the glass structure.

4. The glass polishing apparatus of claim 2, wherein the protruding portion includes at least one vacuum hole applying suction to the first flat portion of the glass structure and the second flat portion of the glass structure.

5. The glass polishing apparatus of claim 1, wherein:

the roller unit includes a brush and a rod connected to the brush; and the brush is configured to polish a concave side of the curved portion of the glass structure.

6. The glass polishing apparatus of claim 5, wherein the rod includes a spray nozzle configured to spray a fluid.

7. The glass polishing apparatus of claim 6, wherein the roller unit is configured to move as the brush and the rod are disposed between the first flat portion of the glass structure and the second flat portion of the glass structure.

8. The glass polishing apparatus of claim 6, wherein the rod includes a suction nozzle configured to apply suction to the fluid.

9. The glass polishing apparatus of claim 5, wherein the brush includes planting areas where a plurality of bristles are disposed and non-planting areas, in which there are no bristles, disposed between the planting areas.

10. The glass polishing apparatus of claim 5, wherein the first holding groove and the second holding groove extend in a first direction, and the brush and the rod are each arranged in the first direction.

* * * * *